(12) United States Patent
Jakubec et al.

(10) Patent No.: US 8,534,602 B2
(45) Date of Patent: Sep. 17, 2013

(54) RESIDENCE AND SLEEPING MODULE WITH A CONNECTABLE PARTIAL MODULE FOR ACCOMODATING AT LEAST ONE MEMBER OF AND AIRCRAFT CREW

(75) Inventors: Wojciech Jakubec, Senden (DE); Rüdiger Huppert, Senden (DE); Kathrin Voelkner, Blaubeuren (DE); Thomas Sütthoff, Hamburg (DE); Jovan Ulbrich-Gasparevic, Pinneberg (DE); Felix Helfrich, Hamburg (DE); Dejan Golubovic, Hamburg (DE)

(73) Assignee: Airbus Operations GmbH (DE)

( * ) Notice: Subject to any disclaimer, the term of this patent is extended or adjusted under 35 U.S.C. 154(b) by 262 days.

(21) Appl. No.: 12/670,006

(22) PCT Filed: Jul. 28, 2008

(86) PCT No.: PCT/EP2008/059889
§ 371 (c)(1),
(2), (4) Date: Feb. 9, 2010

(87) PCT Pub. No.: WO2009/016158
PCT Pub. Date: Feb. 5, 2009

(65) Prior Publication Data
US 2010/0140402 A1 Jun. 10, 2010

Related U.S. Application Data

(60) Provisional application No. 60/962,534, filed on Jul. 30, 2007.

(30) Foreign Application Priority Data

Jul. 30, 2007 (DE) .......................... 10 2007 035 681

(51) Int. Cl.
*B64D 13/00* (2006.01)
(52) U.S. Cl.
USPC ...................................... 244/118.5; 244/118.6
(58) Field of Classification Search
USPC ................... 244/118.5, 118.6; 105/314, 315, 105/323, 326
See application file for complete search history.

(56) References Cited

U.S. PATENT DOCUMENTS 2,761,637 A * 9/1956 Brumby et al. ............ 244/118.5
3,898,704 A 8/1975 Gallaher et al.
(Continued)

FOREIGN PATENT DOCUMENTS

DE 196 20 166 A1 11/1997
DE 69923925 T2 3/2005
(Continued)

*Primary Examiner* — Timothy D Collins
*Assistant Examiner* — Jamie S Stehle
(74) *Attorney, Agent, or Firm* — Lerner, David, Littenberg, Krumholz & Mentlik, LLP

(57) ABSTRACT

The invention relates to a residence and sleeping module in an aircraft, for accommodating at least one member of an aircraft crew, wherein the module comprises a first partial module for docking a second partial module to it. In this arrangement, the first partial module or the second partial module comprises a connecting element, and the first partial module is designed to be arranged at a vertical height of an aircraft, which vertical height differs from that of the second partial module. In this arrangement, the connecting element is designed such that the second partial module can be docked to the first partial module by means of the connecting element.

21 Claims, 15 Drawing Sheets

(56) References Cited

U.S. PATENT DOCUMENTS

| | | | |
|---|---|---|---|
| 4,745,643 A | 5/1988 | Clarke | |
| 5,784,836 A * | 7/1998 | Ehrick | 52/79.8 |
| 5,992,797 A * | 11/1999 | Seidel et al. | 244/118.5 |
| 6,056,239 A | 5/2000 | Cantu et al. | |
| 6,073,883 A | 6/2000 | Ohlmann et al. | |
| 6,182,926 B1 | 2/2001 | Moore | |
| 6,305,645 B1 | 10/2001 | Moore | |
| 6,520,451 B1 | 2/2003 | Moore | |
| 6,808,142 B2 * | 10/2004 | Oki | 244/118.1 |
| 7,156,344 B1 * | 1/2007 | Guering | 244/118.5 |
| 2005/0023413 A1 | 2/2005 | Saint-Jalmes | |
| 2006/0065783 A1 | 3/2006 | Mills | |
| 2008/0302911 A1 * | 12/2008 | Warner et al. | 244/118.6 |

FOREIGN PATENT DOCUMENTS

| | | |
|---|---|---|
| EP | 0514650 | 11/1992 |
| EP | 0901964 A2 | 3/1999 |
| EP | 1010617 A2 | 6/2000 |
| EP | 1279593 A2 | 1/2003 |
| WO | 9614243 A1 | 5/1996 |

* cited by examiner

RESIDENCE AND SLEEPING MODULE WITH A CONNECTABLE PARTIAL MODULE FOR ACCOMODATING AT LEAST ONE MEMBER OF AND AIRCRAFT CREW

CROSS-REFERENCE TO RELATED APPLICATIONS

This application is a national phase entry under 35 U.S.C. §371 of International Application No. PCT/EP2008/059889, filed Jul. 28, 2008, published in German, which claims the benefit of the filing date of German Patent Application No. 10 2007 035 681.3 filed Jul. 30, 2007 and of U.S. Provisional Patent Application No. 60/962,534 filed Jul. 30, 2007, the disclosures of which applications are hereby incorporated herein by reference.

FIELD OF THE INVENTION

The present invention relates to crew rest compartments in aircraft. In particular, the present invention relates to a residence and sleeping module with a connectable partial module for accommodating at least one member of an aircraft crew, to an aircraft comprising a corresponding module, and to the use of a corresponding module in an aircraft.

TECHNICAL BACKGROUND

Crew rest compartments (CRCs) form part of the mandatory equipment of aircraft on long-duration flights. According to international standards, any flight of a duration of between 8 h and 14 h requires one lying-down facility, while flights exceeding 14 h require two lying-down facilities. This is also derived from the requirement wherein from a certain flight duration onwards a total of two alternating cockpit crews must be present on board.

In recent years the security requirements in aircraft have become significantly more stringent, which also requires separation, from the point of view of security, of the cockpit region from the passenger region. As far as design and construction are concerned it may thus be desirable for pilots to have direct spatial access to the flight crew rest compartment (FCRC) from the cockpit, without there being a need for them to enter the passenger region.

Known FCRCs are implemented with two lying-down facilities, arranged side-by-side, in the ceiling area or crown area of the aircraft. Most of the time the cockpit crew has to walk a certain distance to get to the FCRC. From the confined rest region in the interior of the compartment there follows a projecting region in the passenger cabin, e.g. the first-class region, which at least in part may not be of full height.

Likewise, as far as the cabin comfort of crew members is concerned, known solutions are often not designed optimally because there is no spatial separation between the cabins.

Known solutions of FCRCs comprise two lying-down facilities. However, in approximately 70%-80% of cases the second bed is not used because the crew is only augmented by one further pilot. The second bed thus takes up storage space and volume that is urgently needed in the aircraft. Furthermore, the weight component of the unoccupied module is a disadvantage that is to be urgently avoided especially in the context of the construction of large-capacity aircraft.

In contrast to the solutions relating to the flight crew (pilots) the compartments for the cabin crew (service personnel) are, for example, arranged in the rear end of the aircraft. As a rule, this arrangement necessitates the use of at least two stairs, ladders or staircases and ascent devices. In known solutions, in which beds are provided for both parts of the crew, there is only a single crew rest compartment but not a combination of two independent crew rest compartments.

Known solutions are arranged unfavourably from a spatial point of view (e.g. at the end of the main cabin); they provide only little comfort (e.g. low head height), or they meet other requirements only inadequately, for example the desire for spatial separation of the two beds for the flight crew. Furthermore, their visual influence on the cabins is often negative. However, there is a decisive disadvantage in that as a result of the use of two separate CRCs, in this separate arrangement valuable space is lost because each compartment requires a staircase. The resulting additional weight component of the aircraft is of considerable significance especially in these times where there is a requirement for reducing kerosene consumption and thus exhaust emissions.

PRESENTATION OF THE INVENTION

Stated are a residence and sleeping module for accommodating at least one member of an aircraft crew, an aircraft comprising such a module, and the use of such a module in an aircraft according to the independent claims.

Stated is a residence and sleeping module for accommodating at least one person, for example a member of an aircrew (a so-called crew rest compartment CRC or, if need be, a so-called flight crew rest compartment FCRC). The residence and sleeping module comprises a first partial module for docking a second partial module to it. In this design the first partial module is designed to be arranged at a vertical height of an aircraft, which vertical height differs from that of the second partial module, wherein at least the first partial module or the second partial module comprises a connecting element. In this arrangement the connecting element is designed such that the second partial module can be docked to the first partial module by means of the connecting element. In this exemplary embodiment and in all the other exemplary embodiments the use of the compartments by passengers is possible and if required also desirable. All the functionalities are, of course, provided likewise.

Furthermore, a first partial module of the entire residence and sleeping module can be installed as a fixed installation on the main deck of an aircraft and can be designed for the docking of a second partial module. To this effect the first partial module comprises, for example, a passage downwards. Furthermore, the module according to the invention can comprise a second partial module, wherein the first partial module or the second partial module (or both partial modules) comprises (comprise) a connecting element and wherein the second partial module is accommodated on a cargo deck or in the underfloor region of an aircraft. In this arrangement the connecting element of the first partial module can be designed such that the second partial module can be docked to the first partial module by means of the connecting element. In this case mutual mechanical affixation of the two partial modules takes place by way of the connecting element with the use of, for example, screws, clamps, bonding connections, locking bolts or similar so that from the point of view of statics both partial modules form a single unit.

However, it is also possible in each exemplary embodiment of the present invention on the cargo deck level to affix each partial module to the floor of the cargo deck and thus to the floor of the corresponding partial module. In this case the connecting element between the partial modules only assumes visual significance. In this arrangement the connecting element could also be used only as a trim element. Thus the connecting element can be provided, for example, by a sealing lip that creates a spatially flowing transition between the partial modules. In this arrangement complete force take-up and force introduction into the structure of the aircraft is effected on the cargo deck level by means of the floor affixation or the floor tie-down of the partial module. This thus takes place analogously to the usual affixation of a cargo container in an aircraft. In this arrangement, affixation of the partial module is preferably by means of usual affixation points. This affixation option ensures that the second partial module in all its functions and characteristics corresponds to a usual cargo container for aircraft and can be treated as such. If it were to be necessary in the design of an exemplary embodiment, both affixation types are also possible for each desired partial module on the cargo deck level. This applies to all the exemplary embodiments of the present invention and to all the mentioned partial modules with a connecting element. In this context the term "docking" or "docking connection" includes both the described options in floor tie-down and in mutual affixation of the modules.

In this arrangement the position at which the connecting element is affixed can be selected such that the structure of the floor with any support elements is not unnecessarily weakened by the affixation of a connecting element.

It is important that the mechanical connection (i.e. the uptake of forces) can take place by way of an affixation device on the floor—analogous to that used with conventional containers. If the term "functional docking" is used, the connecting element is indeed used as a docking element but it does not take up any forces; instead it only allows access to, or passage to, the docked-on module.

In the first partial module both a sleeping region and a work region can be provided for members of the crew. These two regions are in an elevated position relative to the main deck, for example in the crown area of the aircraft. In this arrangement in the sleeping region of the fixed part of the residence and sleeping module a laying-down facility is provided.

By means of a first ascent device a crew member moves from the main deck to the elevated first partial module of the crew rest compartment. In this arrangement the ascent device can be any mechanical device that makes it possible to climb from a lower level to the first partial module. More specifically, this ascent device may be a stair arrangement, a ladder, an individual step or a landing that makes it possible to climb up. In this arrangement the ascent device is accommodated in the interior of the first partial module, in the so-called staircase.

By means of this interior solution of the ascent device it is possible, when compared to conventional affixation of the ascent device on the front or outside of the partial module, to provide additional storage space underneath the first partial module. The entire width, entire height and entire depth of this additional space that becomes available as storage space underneath the module can thus be used, for example, for trolleys, baggage, as a wardrobe, for safety devices such as fire extinguishers, or for other purposes.

In the upper region of the first partial module, in which the sleeping region of the first partial module is also housed, there can also be a work region with a seating facility and a table or shelf. The work region may be separated from the sleeping region by a difference in height, wherein in this case the difference in height can be overcome by additional steps in general, i.e. by an ascent device. In this arrangement the work region can be partly separated from the sleeping region by means of partition walls. Likewise, separation within the sleeping room by means of such partition walls is possible. Since in the sleeping region at least one sleeping facility, but also several sleeping facilities, can be provided and likewise some spatial separation of the sleeping cabins is to be ensured, such partition walls are an important means of providing privacy to the module user. Furthermore, according to a further exemplary embodiment of the present invention, the work region comprises various storage spaces, for example wall cupboards or normal cupboards Likewise a sideboard can be installed for depositing materials. By means of the provision of one or several sleeping facilities in the first partial module the number of sleeping facilities can be flexibly adapted to the requirements of the given flight or to the size of the crew. Thus the possible scope of use of the module is significantly enhanced. Thus according to international standards, flights of a duration of less than eight hours do not require a sleeping facility, flights of a duration of between 8 and 14 hours require one sleeping facility, while flights exceeding 14 hours require two sleeping facilities.

According to a further exemplary embodiment of the module according to the invention, the residence and sleeping module is designed such that a second partial module can be affixed to and connected to this first partial module by way of a connecting element that comprises the first partial module or the second partial module (or both partial modules). As already described, this connection can be merely of a visual nature but not of a mechanically affixing nature. In order to make the container-like partial module able to be handled like a true container for an aircraft, on the cargo deck level the module can be affixed so that the connecting element to the first partial module can, for example, be designed so as to comprise a simple sealing lip.

If required, this so-called dock-on module on the cargo deck level can be affixed to the first partial module of the residence and sleeping module. In this way a high degree of flexibility in relation to the required sleeping facilities is achieved. In this arrangement the fixed part of the crew rest compartment is installed on the main deck of the aircraft and is located above the dock-on module that is accommodated on the cargo deck of the aircraft. This not only meets the requirement for separate cabins for the crew, but it also saves area and volume because part of the compartment is placed underneath the main deck. In this arrangement, access from the first partial module to the second, lower-lying partial module is by way of a second ascent device, which can be designed as a stair arrangement or a ladder or individual steps, and by way of a hatch. There may be an advantage in that when required it is easy to connect a dock-on module that is accessible directly by way of the staircase of the first partial module. In this arrangement the term "docking" or "docking connection" refers, for example, to a firm mechanical affixation of the two partial modules in every possible embodiment. However, if one further partial module or several further partial modules are affixed on the cargo deck level to the floor of the cargo deck, the term "docking connection" can also refer merely to the mechanical bringing together of the two partial modules, without the need for them to be mutually affixed. The resulting connection is then rather of a visual nature. This also applies to a docking connection between a module on the cargo deck level and a further module on the cargo deck level.

However, it is also possible for the first partial module and the second partial module to be affixed to each other so that they form a mechanical unit. Both affixation options provide an option of getting from the first partial module to the second partial module directly by way of the staircase of the first partial module through a hatch and by way of a second ascent device that forms part of the second partial module. This applies to all the exemplary embodiments and to all the partial modules of the present invention.

Since as a result of the present invention the dock-on module is now installed as a variable and exchangeable solution on the cargo deck of the aircraft it no longer needs to meet the shape requirements and the security requirements of a module that is arranged on the main deck and thus in the passenger region or in the cockpit region. In order to provide a free space design that is as unrestricted as possible within the passenger region, crew rest compartments that are accommodated on the main deck need to meet certain shape requirements. For example, these CRCs on the main deck should be as non-invasive as possible in the passenger region in order to, in that location, provide sufficient space for storage, safety equipment or free space for increased convenience in that region. With the dock-on module now being accommodated on the cargo deck, such shape requirements are no longer necessary, which can result in a more lightweight shape-optimised design of the container-like dock-on module. In particular in the context of the construction of large-capacity aircraft this lightweight construction argument becomes ever more significant.

Due to possible terrorist threats in aircraft, which threats have become more acute in recent years, separation of the cockpit region from the passenger region is becoming essential for security reasons, and direct entry, from the cockpit, for the cockpit crew, into the module is to be ensured. Finally, for some time there has been a requirement to design the cockpit region including the FCRC that is situated behind it as a security zone that from the point of view of security is separated from the passenger region and is not readily accessible. However, this can also mean that the walls of the crew rest compartment or of a dock-on module need to meet certain safety or security requirements, such as resistance to burn-through, as well as a bullet-proof and puncture-proof construction if they are accommodated on the main deck. By integrating the dock-on module in the cargo deck of the aircraft, these security or safety requirements for the dock-on module no longer apply, which in turn provides an opportunity to design the dock-on module in a particularly lightweight manner both in relation to its materials and shape.

As a result of this modular design of the crew rest compartment the cabins are not only spatially separated but they also provide a high degree of flexibility, and the provision of various dock-on modules on the cargo deck makes it possible to have different design variants of the entire residence and sleeping module. Likewise, if no additional bed is required for the flight crew or crew, the dock-on module can be removed from the cargo deck by means of the usual container transport belts. As a result of the dock-on module being in the shape of a cargo container it can be integrated without any problems in the environment of the cargo deck with surrounding cargo containers.

The second dock-on module, which is situated on the cargo deck of the aircraft, can also provide at least one sleeping facility for the crew. Said dock-on module is entered through a hatch that connects the first partial module in the upper region of the aircraft in the so-called main deck with the second partial module. By way of a second ascent device, which can be any mechanical device that makes it possible to climb up from the lower second partial module to the first partial module situated above it, the user can move from one module to the next. In particular, this ascent device may be a stair arrangement, a ladder, an individual step or a landing that makes it possible to ascend. In this arrangement, from the point of view of spatial design and the provision of comfort accessories, such as a table and bed, the second partial module can be designed so as to be identical to the upper first partial module.

In this arrangement, at a transition region on a sidewall of the second partial module, there can be an opening that is designed as a hatch, door or climb-through opening that makes it possible to pass through or enter an adjacent third dock-on module. Thus serial connection of several dock-on modules that are all situated on the cargo deck of the aircraft can be ensured. This not only provides a high degree of privacy to each module user, but also allows individual adaptation of the entire residence and sleeping module to the spatial and personal requirements of the respective flight. By means of conveyance via transport belts in the cargo deck region these container-like second and third partial modules can quickly and without any problem be moved to the desired modular position.

In this arrangement all the partial modules used can comprise a work region and a sleeping region that provides at least one sleeping facility.

As a result of this modular unit comprising a first partial module and at least one second partial module that is affixed on the cargo deck below the main deck, urgently required space is provided on the main deck. This gain of area as a result of the displacement of various compartment parts below the main deck is particularly important in those cases where apart from the sleeping facility already provided by the first partial module on the main deck no further sleeping facility is required. In this case it is possible without any problem for a further cargo container to be present at the place on the cargo deck, at which place otherwise a second partial module can be present. As an alternative, the second partial module, after it has been removed from the cargo deck, is not replaced by a cargo container, and consequently a reduction in the weight of the aircraft is achieved. Since the lower part of the residence and sleeping module can be accessed by the crew through a hatch directly from the staircase that is arranged at the top, which staircase is situated in the interior of the first partial module, a convenient and above all safe way is provided for the crew to move from the main deck to the modules that are situated in the lower region on the cargo deck.

Further embodiments are stated in the dependent claims.

The following details describe the present invention with reference to a module for accommodating at least one member of an aircraft crew. However, it should be noted that this embodiment can relate both to an aircraft comprising a corresponding module, and to the use of a corresponding module in an aircraft.

According to a further embodiment of the module according to the invention, the first partial module comprises at least one sleeping facility.

Since in approximately 70 to 80% of flights a fixed second bed in a flight crew rest compartment is not used, because the crew is only augmented by one further pilot rather than two, the additional second bed only uses up valuable space in the aircraft. This space could otherwise be made available for alternative use. By a reduction in the supply of sleeping facilities in the first partial module of the present invention, with the concurrent provision of one or several sleeping facilities in the second partial module a situation can at the same time be achieved in which as much space as possible is provided within the upper part of the compartment. However, minimisation of the required space in the upper part of the FCRC can also be achieved. In this way the smallest possible intrusion of a compartment into the passenger region can be achieved. Since the second partial module, the dock-on module, can be removed from the cargo deck when said module is not required, it is thus possible to adapt the crew rest compartment in a weight-optimal manner to the required number of sleeping facilities. In this way in particular in the expensive weight optimisation of large-capacity aircraft it is possible to make a significant contribution to the lightweight nature of the residence and sleeping modules. Likewise, as a result of the spatial separation of the sleeping facilities the requirement for increased comfort and privacy within the sleeping and residence regions of such crew rest compartments is taken into account.

According to a further exemplary embodiment of the module according to the invention, the module comprises a second partial module, wherein the second partial module comprises at least one sleeping facility.

In this exemplary embodiment and in any other exemplary embodiment of the module according to the invention the term "sleeping facility" also includes a lying-down facility. The term "sleeping facility" or "lying-down facility" refers to any device that makes it possible for a person to be in a position to lie down or sleep. The lying-down facility may be designed as a simple foam support, however an anatomically matching shape of the elements as well as special constructions are also possible in order to allow comfortable longer-term lying down. In this arrangement possible designs are, in particular, a bed, couchette, plank bed, folding bed, hingeable bed and any further design of a lying-down facility. In this arrangement in each exemplary embodiment of the present invention variants of a folding bed can, in particular, provide the option in the folded state of being used as a table or a shelf. If only part of the bed is hinged, the remaining part of the bed can also be used as a storage compartment or shelf. Furthermore, one variant of a folding bed provides the option of increased floor space and thus freedom of movement when it is hinged or folded in. This provides enhanced module comfort.

According to a further exemplary embodiment of the module according to the invention, the first partial module is designed as a fixed installation on a main deck of the aircraft.

Since according to international standards any flight of a duration of between 8 hours and 14 hours requires one lying-down facility it may be sensible to design the first partial module of the present invention as a fixed installation on the main deck of an aircraft, and in this way to provide at least one sleeping region with a sleeping facility. Depending on requirements, a second partial module can then be docked to this first partial module of the present invention, by way of the connecting element of the first partial module. In this context the term "docking" refers to a mechanical connection which is, for example, established with the use of screw-type fasteners between the two partial modules so that they form a mechanical unit. Furthermore, further partial modules can follow on from the second partial module, which is situated on the cargo deck and thus underneath the main deck, which further partial modules are also arranged below the main deck on the so-called cargo deck. In this arrangement the connecting element assumes a significant role in that it makes docking possible. The latter may firstly refer to mutual affixation of the two partial modules that are arranged one above the other, or secondly to the establishment of a connection between the partial modules, which connection is of a visual nature rather than of a static, i.e. load-bearing, nature. This applies to all the exemplary embodiments of the module according to the invention. As is, for example, shown in FIG. 1, this connecting element reaches from the floor of the main deck to the ceiling of the cargo deck. In this arrangement the connecting element is situated on the floor of the first partial module and is completely surrounded by the walls of the first partial module. This makes it possible for a member of the crew to climb directly from the staircase of the first partial module through the hatch and the connecting element into the second partial module. This requires a second ascent device by way of which climbing through the hatch into the second partial module is possible. Likewise, further modules, which are placed beside the second partial module, can be affixed, connected or docked to the respective adjacent modules by way of connecting elements that are situated in the transition region to said respective adjacent modules.

In contrast to the fixed installation of the first partial module on the main deck level, the second partial module, as well as each further partial module to which the second partial module can be connected, is a variable and mobile installation on the cargo deck level.

According to a further exemplary embodiment of the present invention, the module according to the invention comprises a staircase and a first ascent device, wherein both partial modules of the module according to the invention can be reached directly by way of the staircase.

The stair arrangement on the inside, or the staircase on the inside, of the module according to the invention makes it possible for a direct connection of the module to the cockpit region to be possible. This takes into account the security requirement according to which the pilot does not have to leave the security unit or the security zone comprising the cockpit and the flight crew rest compartment in order to reach the compartment. In one embodiment the ascent region of the module is thus designed such that it is possible to reach this staircase of the module by direct access from the cockpit without having to walk through the passenger cabin. When a member of the crew has safely arrived at the staircase she or he then has direct access to the crown area to the first sleeping facility of the first partial module or by way of the hatch and the second ascent device into the second partial module where a second lying-down facility can be provided. This direct entry option from the staircase or from the ascent region of the module according to the invention into the partial module that is situated on the cargo deck level also implements access paths that are as short as possible for members of the crew.

According to a further exemplary embodiment of the module according to the invention, the module comprises a second ascent device and a hatch, wherein the second ascent device and the hatch are designed to provide access from the first partial module to the second partial module from the main deck through the hatch.

In this arrangement the ascent device can be any mechanical device that makes it possible to climb from a lower level in the second partial module to the main deck. More specifically, this ascent device may be a stair arrangement, a ladder, an individual step or a landing that makes it possible to climb up. In contrast to this the hatch is implemented as a mechanical component that in the hinged-open state makes it possible to enter from the upper main deck region to the lower cargo deck region, and in the hinged-closed state separates both partial regions from each other. Since the hatch is integrated in the floor region of the main deck it is mechanically designed in such a way that persons using the module can stand on said hatch with their entire bodyweight.

According to a further exemplary embodiment of the module according to the invention, the second partial module is designed in the form of a cargo container for an aircraft.

Since the second partial module is arranged on the cargo deck, and thus does not have to meet the shape requirements and security requirements applicable to the main deck, it can be advantageous to design the second partial module in the shape of a cargo container as commonly used in aircraft. In this arrangement non-problematic integration of the second partial module into the environment of the cargo containers is provided. This might result in a weight advantage because any security or safety criteria such as a puncture-proof, bullet-proof or burn-through resistant construction, which may apply to the main deck level, are not required at this cargo deck level. By designing the second partial module in the form of a cargo container this second partial module can, within the context of transport during conversion to the desired module variant of the module according to the invention, be treated and transported like a normal cargo container. This significantly increases the flexibility and mobility of the module according to the invention.

According to a further exemplary embodiment of the module according to the invention, the second partial module comprises a transition region with an opening, wherein the opening is designed for a crew member to move from the second partial module to further partial modules. In this arrangement the further partial modules, like the second partial module, are accommodated on the cargo deck of the aircraft.

Starting from the minimum provision of sleeping facilities for the crew, in other words a fixed crew rest compartment on the main deck level with one bed, by means of the modular docking variant according to the invention in a first step by way of a second partial module that is located on the cargo deck a second sleeping facility can be provided. In further steps the module according to the invention makes it possible to connect further partial modules, which are also located on the cargo deck, to the second partial module. To this effect the second partial module and likewise any further modules on the cargo deck comprises/comprise a transition region and an opening which make it possible to move through the second partial module into each further partial module. In this arrangement docking is implemented in a manner that is analogous to the docking of the second partial module to the first partial module with all the associated mechanical prerequisites.

In this arrangement the opening can be a recess in the sidewall of the cargo-deck partial modules. However, a design as a door, flap, hatch or through-duct is also possible. In this arrangement any further partial module is designed such that, independently of any further partial module, docking is also possible to the first partial module that is situated on the main deck. Apart from a transition region and an opening for docking to further partial modules, each further partial module can thus comprise a region in the ceiling surface, which region is designed in such a way that it can be installed and affixed to the connecting element of the first partial module. This applies to all the partial modules on the cargo deck level.

This additional modular expansion on the cargo deck level makes it possible for the residence and sleeping module according to the invention to be fully adapted to the requirements of the crew without having to undertake any installation-related changes on the main deck of the aircraft. Since all the further partial modules on the cargo deck level can be designed in the form of a standard aircraft container or cargo container for an aircraft, perfect integration of these parts of the module in the environment of the cargo containers is ensured. Likewise, simple and practicable conveyance of the further partial modules on the cargo deck level by means of the available transport belts for cargo containers is a significant advantage. In this arrangement it is quite possible that each individual partial module both on the main deck level and on the cargo deck level is designed only as a sleeping region, only as a work region, or both as a residence- and sleeping region. In this way each module can provide one or several sleeping facilities, one or several seating facilities, various storage spaces and also various shelves or tables on which to deposit items. To provide the maximum of storage space an empty module is also conceivable in any of the embodiments.

According to a further exemplary embodiment of the module according to the invention, the first partial module comprises a first sleeping region and an ascent region for climbing up from a lower level.

To this effect the ascent region comprises the first ascent device, which can be any mechanical device that makes it possible to climb from the lower level into the first partial module. In particular, this ascent device may be a stair, a ladder, an individual step or a landing that makes it possible to climb up. The ascent device is essentially characterised in that it makes it possible to descend directly from the upper region of the first partial module on the main deck level, and that it leads directly into the entry to the second partial module that is arranged on the cargo deck level. In this arrangement it is advantageous if the ascent region is located on the inside in the first fixed partial module, rather than on the face or outside of the partial module as has been the case in the solutions presented so far. In this way any loss of space as a result of the ascent device projecting into the passage region of the lower level can be avoided. However, if the requirements relating to the module and the lower level should render it necessary, a design where the ascent region is situated externally is also possible in this and in any other exemplary embodiment of the module according to the invention. The hitherto-applied solution of affixing the ascent device to the face of the module is improved in the present invention so that the space underneath the module is fully available as storage space. In contrast to this, in each exemplary embodiment of the present invention the first sleeping region of the first partial module can be designed so as to be arranged either parallel to the longitudinal axis of the aircraft or transversely to the longitudinal axis of the aircraft. However, any angled solution is also possible. Said first sleeping region provides at least one sleeping facility for the crew, and is clearly set apart from the possible work region of the first partial module. The module provides for the two regions to be able to be separated from each other in order to enhance the comfort and the privacy of each user.

According to a further exemplary embodiment of the module according to the invention, the first partial module comprises a work region to accommodate a member of the aircraft crew.

In this arrangement this work region in this exemplary embodiment and in any other exemplary embodiments can also be used completely and comprehensively as a rest region. In this work region, both a seating facility and a table are provided. The term "seating facility" can refer, for example, to a folding seat, aircraft seat, passenger seat, business class seat, and high-comfort cabin attendant seat. Likewise, the seating facility can be designed as a TTL-certifiable seating facility, with TTL denoting Taxi Take-off Landing. Furthermore, the table provided is a table from the group comprising a folding table, solid table, backrest fold-out table and swivellable table. Furthermore, the work region of the module according to the invention comprises various storage spaces, for example wall cupboards or normal cupboards. Likewise, a sideboard on which to deposit materials is installed.

The work region and the sleeping region may be separated by a height difference, wherein in this case the height difference can be overcome by means of additional steps, generally speaking as an ascent device. In this arrangement the work region is partly separated from the sleeping region by means of partition walls. Likewise, separation within the sleeping space by means of such partition walls is possible.

As a result of its spatial design, the work region of the module can be used on the one hand as a rest space, which was not possible with the hitherto-known flight crew rest compartments; on the other hand the design takes into account the demand for increased levels of comfort relating, for example, to the seating facility, standing height and headroom in the sleeping region.

The spatial arrangement of the sleeping region and work region makes it possible to provide sufficient space for rest space. Apart from providing the compulsory fitting of sufficient sleeping facilities for members of the crew in aircraft, a module with a work region provides considerably more flexibility and layout options for members of the crew in their off-times and breaks. In this way the entire comfort of the compartment is significantly enhanced.

According to a further exemplary embodiment of the module according to the invention, the first partial module is designed such that the volume underneath the work region is available to its full width, full height and full depth as an area in which items can be placed.

This is essentially achieved in that the ascent region and the ascent device of the first partial module are not affixed to the outside or face of the module. This results in the unlimited provision of storage space underneath the work region. This storage space can thus be used to its full width, full depth and full height, for example for trolleys, baggage, a wardrobe, safety devices such as fire extinguishers, or in any other manner. Moreover, this embodiment is more lightweight than known embodiments. In particular in the era of large-capacity aircraft this argument becomes ever more important and at the same time clearly illustrates the advantageous nature of this solution.

According to a further exemplary embodiment of the module according to the invention, the work region comprises at least one element selected from the group comprising a seating facility, a table and an entrance region.

By means of integration of a seating facility the comfort and the flexibility of the module according to the invention may additionally be enhanced. For example, a crew member present in the module according to the invention is not basically forced to be in a position lying down, instead s/he is free to decide in favour of the position which meets their individual preference at the time. This makes it agreeable to spend time in the module. Furthermore, the level of comfort is also enhanced. Likewise, the integration of a table represents a considerable enhancement to the comfort provided, which enhancement clearly widens the possible spectrum of activity of a crew member in the module.

With the integration of an entrance region the functionality of the module according to the invention can be still further enhanced. Thus the use of the entrance region as a change room, preferably for members of the crew, is possible. Furthermore, an entrance region, preferably at floor level of the module, makes it considerably easier to reach the individual components of the module, because there is no need to directly enter or climb into these modules. A correspondingly generous design of an entrance region can make it more agreeable to stay in the module according to the invention.

According to a further exemplary embodiment of the module according to the invention, the seating facility is a seating facility from the group comprising a folding seat, aircraft seat, passenger seat, business class seat, TTL seat and high-comfort cabin attendant seat.

In order to, on the one hand, provide the most flexible adaptation possible to special requirements, while, on the other hand, also providing, for example, maximum comfort, the seating facility may be implemented in various ways. For example, installation of a folding seat is possible. In this arrangement the functional basic requirement, namely the provision of a seating facility, is implemented to the full extent, but there are further advantages as a result of the increased available space that a folding seat that is not required, and whose seating area is folded in, or also with folded-in backrest or back supports where provided, can provide. Furthermore, folded components can have additional functions, for example by providing further areas on which to place or deposit items.

In contrast to this, if there is a requirement for enhanced comfort, the seating facility according to the invention can also be implemented as a regular aircraft seat or passenger seat, and furthermore the installation of a seat with enhanced comfort characteristics is possible, for example a business class seat or a high-comfort cabin attendant seat. This may be associated with additional advantages, for example expanded options for controlling mechanical and electronic components of the compartment, such as the airstream, light, entertainment electronics such as video/DVD reproduction to a corresponding display, temperature, communication. Furthermore, a business class seat makes it possible to easily integrate an additional placement area, for example a folding table stowed in an armrest or elsewhere. Integration of a separate table for the seating facility may thus not be necessary in the compartment.

According to a further exemplary embodiment of the module according to the invention, the table is a table from the group comprising a folding table, solid table, backrest fold-out table and swivellable table.

In order to, on the one hand, support the most flexible adaptation possible to various requirements relating to the convenience and furnishing within the compartment, while, on the other hand, also providing, for example, maximum comfort, the table may be implemented in various ways. For example, installation of a folding table is possible. In this arrangement the functional basic requirement, namely the provision of a table, is implemented to the full extent, but there are further advantages as a result of the increased available space that a folding table that is not required, and whose table top is folded-in can provide. Furthermore, folded components can have additional functions, for example by providing further areas on which to place or deposit items. However, if greater comfort requirements are to be met, a solid table can also be installed so as to be fixed. In order to provide as flexible and mobile a solution as possible, the table can also be implemented in a swing-out design.

According to a further exemplary embodiment of the module according to the invention, the first partial module is designed so as to essentially directly follow on from the cockpit.

By means of a corresponding design, the space requirement can be further reduced. The module, which is essentially used for the cockpit crew, is arranged so as to be spatially closer to the cockpit. In this way the paths and thus the time taken for the cockpit crew to reach the module can be minimised. In this way the concept of separating the cockpit region from the passenger region for security reasons, a concept that is becoming increasingly important, can be taken into account, and direct entry from the cockpit into the module is directly possible for the cockpit crew. Finally, for some time there has been a security requirement for the cockpit region including the FCRC situated behind it to be designed as a security zone which for reasons of security is separate from the rear passenger region and is not freely accessible.

Likewise, designing the module so that it directly adjoins the cockpit ensures less visual and spatial intrusion into the passenger region. This not only means that the cabin design is not influenced, but also, and this is very important, that more volume is available for potential security devices in the cabin region. However, this option of designing the present invention does not preclude the first partial module from being able to be installed at each position along the longitudinal axis of the aircraft. Likewise, at each position along this longitudinal axis of the aircraft, docking-on the second partial module on the cargo level is possible. Nor is there any limitation, in relation to any of the further partial modules on the cargo level, which further partial modules can be docked to the second partial module, as far as positioning of the first fixed part on the main deck level is concerned.

Furthermore, according to a further exemplary embodiment of the module according to the invention, both partial modules are connected to each other by means of at least one element selected from the group comprising a single staircase, a single ladder, a single passage and/or a single hatch.

In this arrangement the connective "and/or" denotes that any combinations of the technical characteristics of "staircase", "ladder", "passage" and "hatch" that can be formulated with "and" and "or" are possible for the module according to the invention. By means of this combination of two CRCs (crew rest compartments) with a single staircase, with a single stair arrangement, or with some other ascent device, a significant area for further seats, trolleys or any desired monuments can be gained. In this arrangement the greatest space and area can be saved if the parts of the staircase of the first partial module are arranged in z-direction directly above or below the parts of the staircase of the second partial module. This is clearly illustrated in FIGS. 10, 16 and 14. If there are certain requirements in the installation and placement of both partial modules it is also possible that while there is only one staircase, both ascent devices are, however, laterally, more precisely in the x- and y-directions, offset relative to each other. This is clearly illustrated in FIG. 12.

Also described herewith is an embodiment in which while several elements are used as an ascent device, however, when both modules are combined only a single staircase forms. In this way the objective of minimising the area used is achieved. For example, FIGS. 11 and 12 clearly show that two staircase parts are used to climb from the lower to the upper partial module. However, the demand for minimising the area used for the transition is met by the vertical staircase. In order to use the smallest possible floor area for the staircase, the stair arrangements and ascent devices are preferably vertical. In this arrangement it may be difficult for a user to directly get to the vertical ascent or descent region, and for this reason an additional ascent device, for example an additional step board, can be installed. This is illustrated in FIGS. 9 and 15.

Both partial modules, each being an independent compartment and in the overall compartment thus represent so-called sub-compartments, can be installed and used independently of each other on all the levels of the aircraft. Hereinafter the term "sub-compartment" is used as an equivalent to the hitherto-used term "partial module".

The second partial module is thus neither in form nor in functionality designed in a container-like manner, but instead is a complete and proper compartment. If a partial module is installed on its own, the docking region which in other cases the second partial module adjoins, is always designed such that the full functionality of the first partial module is provided. This means in particular that a hatch that connects both parts, possibly through a floor, in its closed state is a floor element. In this case the hatch comprises corresponding mechanical characteristics of a floor element.

In addition one of the CRCs (in other words one of the partial modules) can be implemented as a dock-on module so that flexibility is still further increased. In this arrangement docking takes place by means of the connecting element described in detail above. By means of this combination of two partial modules, wherein one staircase can be done without, it is possible to reduce weight.

Furthermore, according to a further exemplary embodiment of the module according to the invention, both in its functionality and its appearance the second partial module is a complete and proper compartment for the cabin region.

In this context the term "complete and proper compartment" refers to a compartment which can be used as a monument without any further adaptations in the cabin region. For example, from the point of view of aesthetics, in other words in relation to shape, material and colour, said compartment is designed so that it meets the requirements of the airline in order to be able to install it in the cabin region in which the passengers are accommodated. In order to, in the upper floor region, i.e. also in the cabin, ensure both a mechanically and visually impeccable connection to other monuments, the second partial module is not designed in the manner of a container, but instead corresponds to a normal complete and proper compartment. This also includes the ability of said module to be installed or affixed by way of the sidewalls, in contrast to container compartments, which can also be affixed to the cargo deck by way of the floor. Furthermore, the outer shape of the module does not match the shape of a container, instead it is identical to the full extent to a CRC at cabin level.

Apart from its colour, shape and material, in its full function, too, said module is like a compartment that is only designed for use on the main deck level.

Furthermore, according to a further exemplary embodiment of the module according to the invention, the first partial module is arranged in a crown area of the aircraft.

The first partial module or the first sub-compartment is thus situated on the main deck of the aircraft. In this arrangement the connection between the first partial module and the second partial module can be through a hatch or a staircase. By arranging a single bed in the crown area, which forms the ceiling region of the main deck or of the cabin, the negative influence on the cabin can be significantly minimised.

Furthermore, according to a further exemplary embodiment of the module according to the invention, the second partial module is arranged on the main deck.

If requirements dictate this, the second partial module can also be arranged on the main deck, i.e. in the cabin. In particular, the module according to the invention can thus comprise the first partial module in the crown area of the aircraft, while the second partial module is arranged on the main deck. This thus provides the option of arranging both modules or sub-compartments on the same deck and of nevertheless connecting them to each other and to the cabin region by way of a single staircase. In this exemplary embodiment the second partial module is not designed like a container, because said container needs to meet the normal requirements of a monument of the cabin as far as its visual appearance and functionality are concerned.

According to a further exemplary embodiment of the module according to the invention, the first partial module is accommodated on the main deck, while the second partial module is accommodated on the cargo deck.

This arrangement of two complete and proper partial modules or sub-compartments that are interconnected only by a single transition region and one ascent device, ensures not only this combination of the module on the cargo deck level and on the main deck level but also the space-minimising and weight-minimising connection, according to the invention, by means of a single staircase, a single ascent device, and/or a single hatch.

Furthermore, according to a further exemplary embodiment of the module according to the invention, the connecting element is designed as an optical trim element rather than for force take-up.

In this arrangement the connecting element effects the connection of the two modules through the floor of the cargo deck level. In this arrangement the introduction or take-up of the main part of the forces acting on the partial module need not be by way of the connecting element, because the partial module on the cargo deck level is preferably affixed to the floor of the cargo deck. In that location the essential force component can be introduced into the aircraft structure. In this arrangement the connecting element may serve only as a trim element, and for example as a sealing lip can close off any free spaces between the two deck levels. In other words, the function of the connecting element is rather of a visual nature.

According to a further exemplary embodiment of the module according to the invention, the connecting element can be exchanged for a closing element.

If only that part of the module according to the invention that is situated on the main deck is used, the connecting element can be replaced by a closing element in order to integrate a non-trip closing arrangement in the floor of the main deck within the first partial module. For this reason the closing element needs to be sufficiently strong to withstand any loads that this floor element is subjected to.

Furthermore, according to a further exemplary embodiment of the module according to the invention, the use of a corresponding module in an aircraft is stated.

Furthermore, according to a further exemplary embodiment of the module according to the invention, an aircraft is stated which comprises a corresponding module.

It should be pointed out that the term "crew" explicitly refers to the members of the flight crew, and that the term "crew rest compartment" can also be used to describe a flight crew rest compartment. Likewise, all the embodiments described in this document in relation to the crew of the aircraft can be used to the full extent by any persons, for example passengers.

Further exemplary embodiments and advantages of the invention are set out in the following description of the figures.

The illustrations in the figures are diagrammatic and not to scale.

Figure 1:
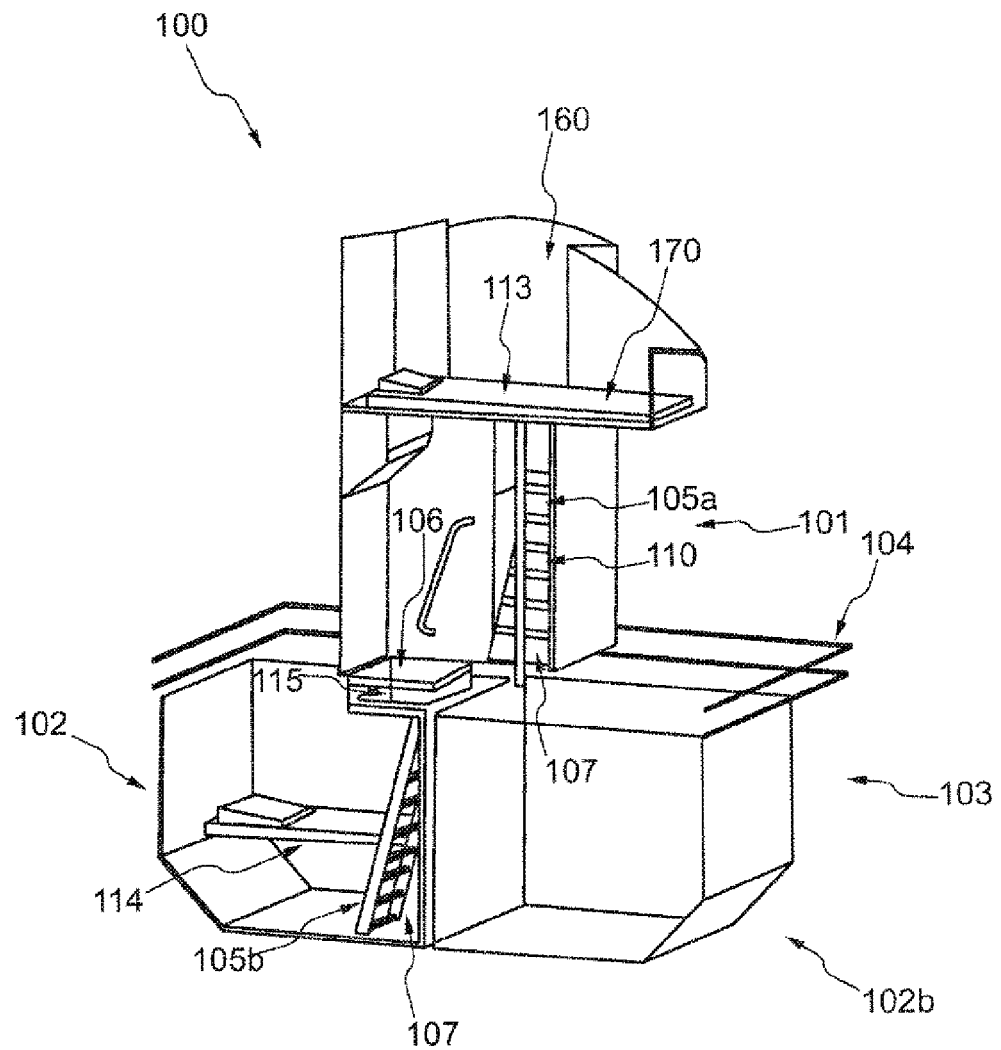
FIG. 1 shows a diagrammatic three-dimensional view of the residence and sleeping module according to an exemplary embodiment of the module according to the invention.

Below, preferred exemplary embodiments of the module according to the invention are described with reference to the figures.

In the following description of the figures the same reference characters are used for identical or similar elements.

FIG. 1 herewith shows a diagrammatic three-dimensional view according to an exemplary embodiment of the present invention. Shown are a first partial module 101 and a second partial module 102, wherein a further module 102b is docked to the second partial module 102 on the cargo deck level. However, the element 102b can also be a standard container for an aircraft on the cargo deck level. In this arrangement the first partial module 101 comprises a first ascent device 105a, from which a crew member can get into the upper region of the aircraft, the so-called crown area. The diagram clearly shows the sleeping region 170 in which there is a sleeping facility of the first partial module. In this arrangement the ascent device 105a by means of which the crew member can get into the work region 160 and sleeping region 170 can be designed as a normal stair arrangement; however, individual steps, a stepladder, various railings or mechanical devices to support ascent are also imaginable. In this arrangement the ascent region 110 is designed in such a way that all elements of the ascent region, i.e. the entire staircase 107 with the ascent device 105a are situated in the interior of the first partial module. In this arrangement the staircase 107 also continues in that part of the module according to the invention that is situated on the cargo deck level 103, where a second ascent device 105b is provided. This makes it possible for a member of the crew to climb directly from the upper part of the first partial module into the second dock-on module on the cargo deck level 103 by way of the staircase. The diagram clearly shows a connecting element 115, which among other things comprises a hatch that makes it possible to open and close access to the lower cargo region. In this arrangement any mechanical construction is possible as a connecting element, which construction makes it possible to firmly affix the two partial modules to each other and thus connects them so that they form a unit. However, if a further partial module or several partial modules have already been affixed on the cargo deck level to the floor of the cargo deck, the connecting element can also merely effect the mechanical bringing-together of the two partial modules without them having to be affixed to each other. The connection arising in this process is rather of a visual nature. This also applies to docking a module on the cargo deck level or in the underfloor region to a further module on the cargo deck level by means of a connecting element.

In this arrangement both affixation options provide the option of getting directly from the first partial module to the second partial module by way of the staircase of the first partial module through a hatch and by way of a second ascent device, which forms part of the second partial module. This applies to all the exemplary embodiments of the present invention.

The shape of the second partial module 102 corresponds to that of an ordinary cargo container for an aircraft 102*b* and can thus be optimally integrated in the cargo space environment. In this arrangement the second partial module 102 is docked to the first partial module 101 thus forming a unit with it. Furthermore, in this exemplary embodiment of the present invention it is also possible for the second partial module 102 to provide a transition region and an opening so that the adjacent container 102*b* can be replaced by a further partial module that can be docked directly to the transition region of the second partial module. This can satisfy the need to provide a further sleeping facility or seating facility. As an example the diagram shows the sleeping facility 114 in the second partial module 102 underneath the main deck 104. However, it should be noted that in relation to all the exemplary embodiments and all the partial modules of the present invention any sleeping facility can be affixed at any desired angle to the longitudinal axis. Of course, this does not preclude the option, in another exemplary embodiment of the present invention, of providing, in the second partial module 102, several sleeping facilities apart from tables, storage spaces and other furnishings required.

Figure 2:
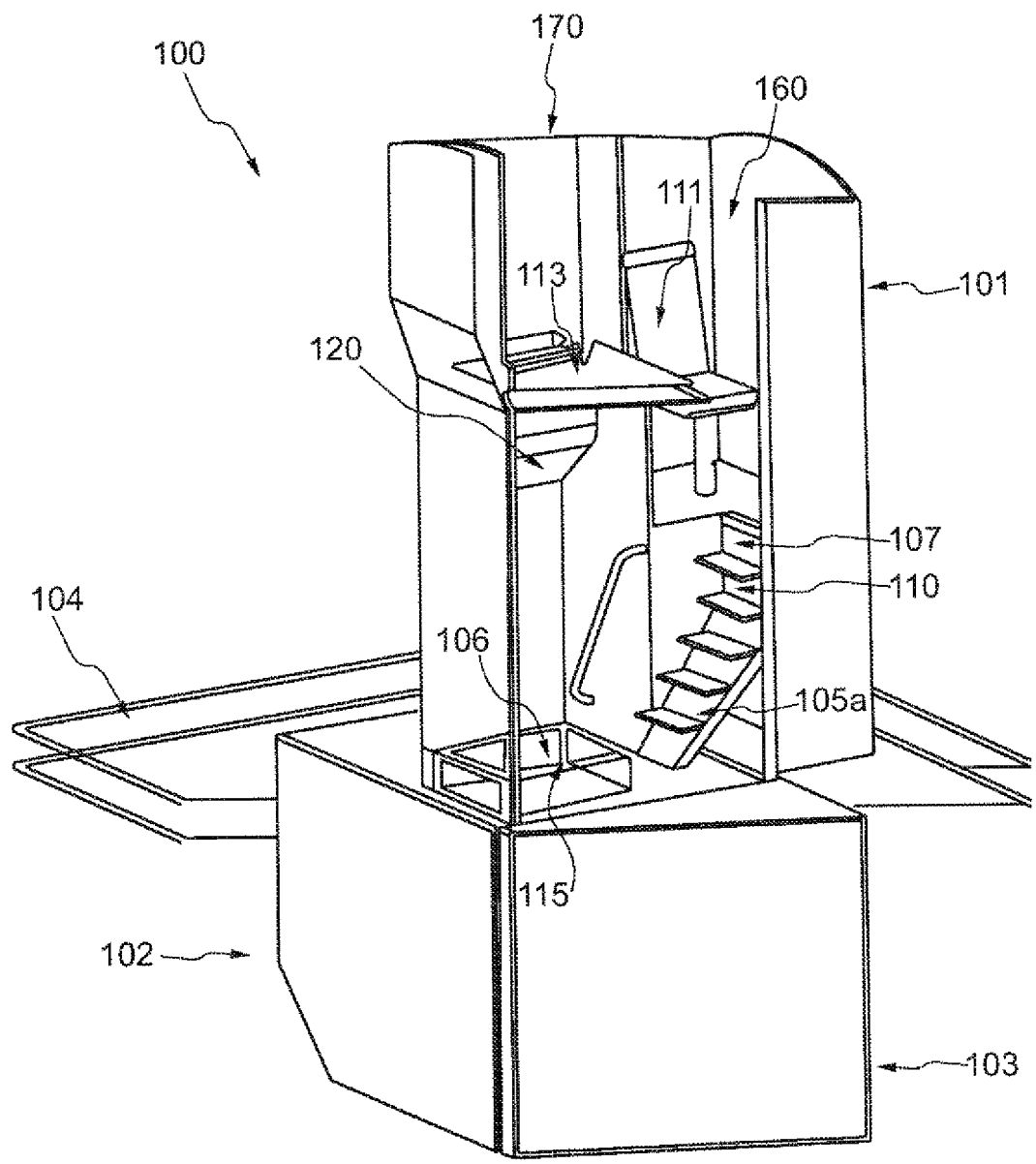
FIG. 2 shows a diagrammatic three-dimensional view of the residence and sleeping module according to an exemplary embodiment of the module according to the invention.

FIG. 2 shows a further diagrammatic three-dimensional view of a residence and sleeping module according to the present invention. This figure clearly shows the work region 160, which is located in the first partial module 101 and which provides a seating facility 111. This work region 160 is spatially distinct from the sleeping region 170, which is situated above it or higher than it, wherein said sleeping region 170 provides a first sleeping facility 113 in the first partial module 101. The illustration clearly shows that in the ascent region 110 a staircase 107 is provided, which comprises a first ascent device 105*a*. This ascent device 105*a* ends directly at the connecting element 115 of the first partial module, which is affixed to the floor of the main deck 104. At this location a hatch 106 is integrated that allows direct entry from the staircase 107 through the hatch into the second partial module 102 on the cargo deck level 103. Apart from the storage compartments 120 shown, it is also possible to create storage options and shelves in the work region 160 provided for this.

Figure 3:
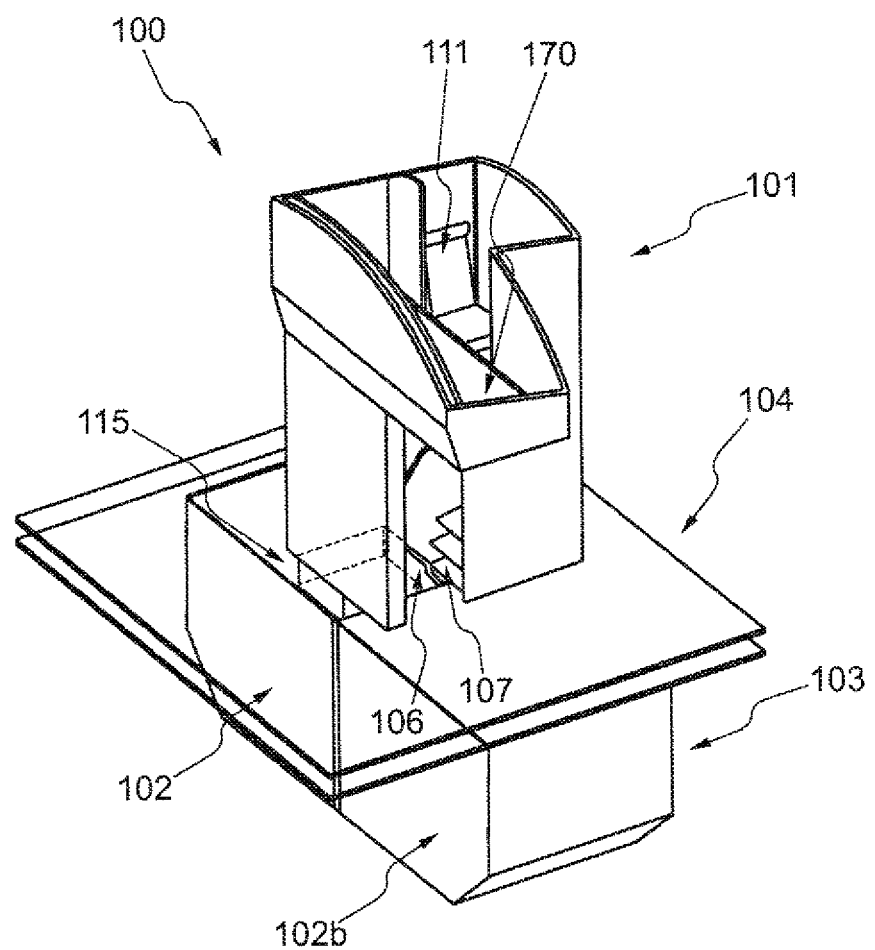
FIG. 3 shows a diagrammatic three-dimensional view, according to an exemplary embodiment of the module according to the invention, with an oblique top view of the module.
Figure 4:
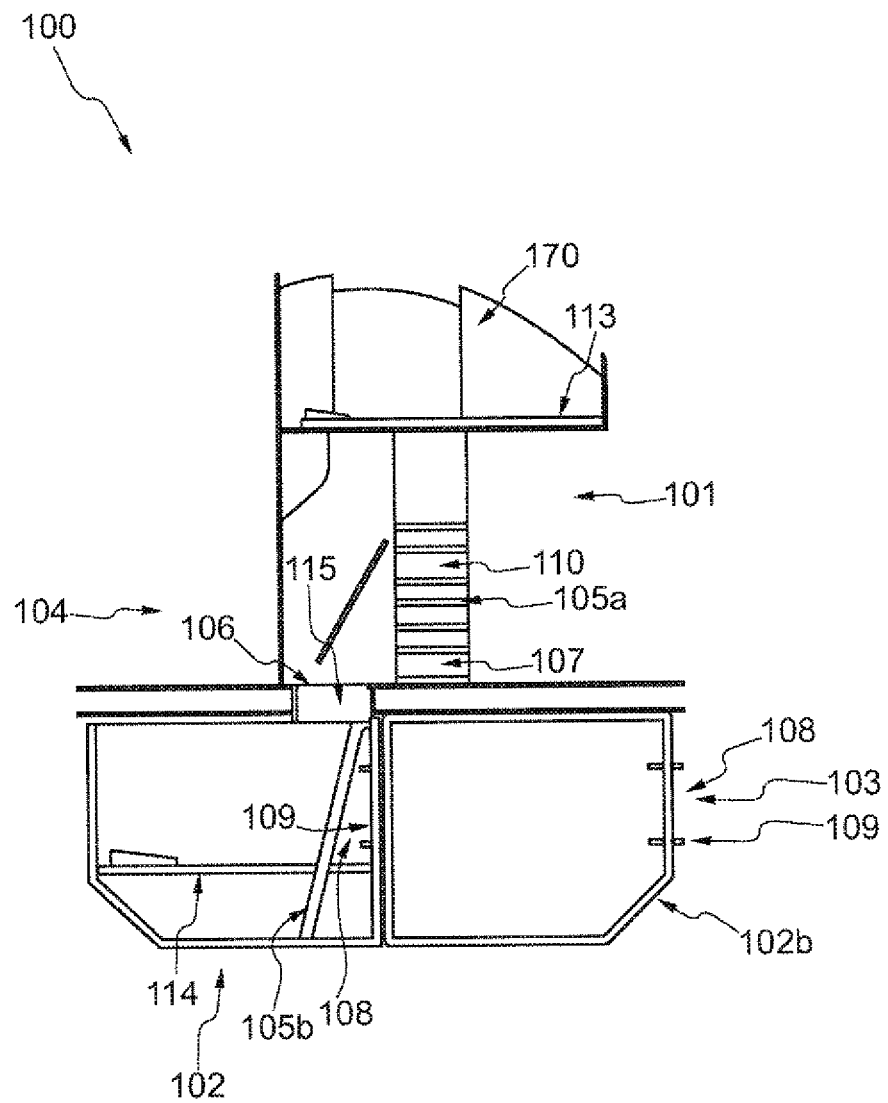
FIG. 4 shows a diagrammatic two-dimensional vertical section view according to an exemplary embodiment of the module according to the invention.

FIG. 3 shows a diagrammatic three-dimensional view of an exemplary embodiment of the present invention, wherein the module 100 comprises a first partial module 101 and a second partial module 102. The illustration clearly shows the spatial separation of the two partial modules as a result of the floor between the main deck 104 and the cargo deck 103. The illustration also shows that the second partial module, which is integrated on the cargo deck level 103, comprises the typical shape of an aircraft container and can thus be ideally integrated in the environment of the cargo space. The module 100 according to the invention provides a significant advantage in that, when required, the second partial module 102 or the dock-on module 102 can simply be docked on, and in that it is accessible directly by way of the staircase 107. With the option of providing a second crew rest compartment as a dock-on module when required, the fixed part 101 of the crew rest compartment in the crown area provides a high degree of flexibility. This dock-on module comprises a bed so that the requirement for separate cabins for the flight crew is also met. In this arrangement, access is by way of a second ascent device, which can be a ladder, a stair arrangement or individual steps. From the main deck 104 the way is through a hatch 106 which provides the connecting element 115 and firmly connects the two partial modules to each other. FIG. 4 clearly shows that spatial separation of the cabins provides a high degree of flexibility, privacy and comfort to the crew. However, the gain in area as a result of displacement of part of the compartment below the main deck 104 is also significant in the context of this invention. The very considerable flexibility provided by the modular design is shown by the further dock-on modules 102 and 102*b*. This provides the option of saving weight when the module is not required, because all the dock-on modules that are not used, for example 102 and 102*b*, can be removed from the cargo container environment 103.

FIG. 4 shows a diagrammatic two-dimensional section view of the module 100 according to the invention. In this arrangement the cross section of the module clearly shows that in the staircase 107 the ascent device 105*a* is installed and that direct ascent for a member of the crew is made possible from the staircase through the connecting element 115 and the hatch 106 into the second partial module, the dock-on module 102. In this arrangement the second ascent device 105*b* is necessary, which can be designed as a ladder, stair arrangement or as individual steps. Likewise, both sleeping facilities 113 and 114 that are provided are shown on different levels 103 and 104 in the two modules. The illustration also clearly shows that the second partial module 102 comprises a transition region 108 that comprises an opening 109 as a passage to further dock-on partial modules 102*b* on the cargo level 103. In this arrangement each further module that in a modular manner can enlarge the entire module 100 according to the invention on the cargo deck level can comprise a transition region 108 and an opening 109 to allow the integration, into the existing module 100, of further modules as dock-on modules. In this arrangement the transition regions are mechanically designed such that firm affixation relative to each other as a unit, for example by screw-type connections, can be possible. This functions analogously to docking the second partial module to the upper first partial module. However, if a further partial module, or several partial modules, is affixed on the cargo deck level to the floor of the cargo deck, it is also possible for only the mechanical bringing-together of the two partial modules to take place in the transition region without said partial modules having to be fixed to each other. The resulting connection is rather of a visual nature. FIG. 4 clearly shows that with step-by-step integration of various partial modules it is possible to precisely meet the requirements for sleeping facilities, work places and storage space, while if these are not required also providing the option of the lightest-possible design of the entire module 100.

Figure 5:
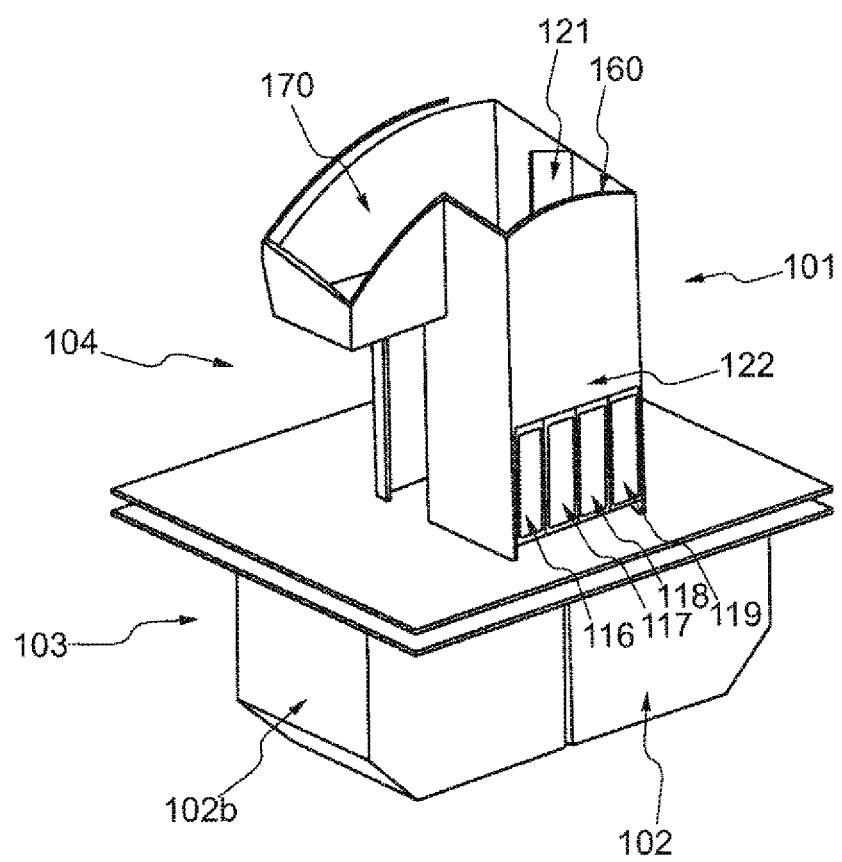
FIG. 5 shows a diagrammatic three-dimensional view according to an exemplary embodiment of the module according to the invention.

FIG. 5 shows a diagrammatic three-dimensional illustration of the module 100 according to the invention. The illustration shows the first partial module 101 on the main deck level 104 with a sleeping region 170, wherein the partition wall 121 spatially separates the sleeping region 170 from the work region 160. A work region 160 comprises, for example, a seating facility, shelves or a table in various shapes so that it can be used as a rest space or a work space. As a result of the design of the staircase on the inside, at the front 122 of the module according to the invention all the storage space underneath the work region 160 is provided. Said storage space can thus be utilised to the full height, full width and full depth, for example, for trolleys 116, 117, 118 and 119 (shown as an example in the illustration). However, this storage space can also be used to accommodate other important elements of the interior equipment of the aircraft, for example, fire extinguishers, a wardrobe or entertainment systems. This illustration clearly shows that the region of the further modules with partial module 102 and 102b does not interfere with the design of the main deck region 104, and furthermore, any changes on the cargo deck level 103 do not manifest themselves as design changes or installation changes on the main deck level 104. This completely independently installed unit 101 does not undergo any changes when the module on the cargo deck level 103 is rearranged.

Figure 6:
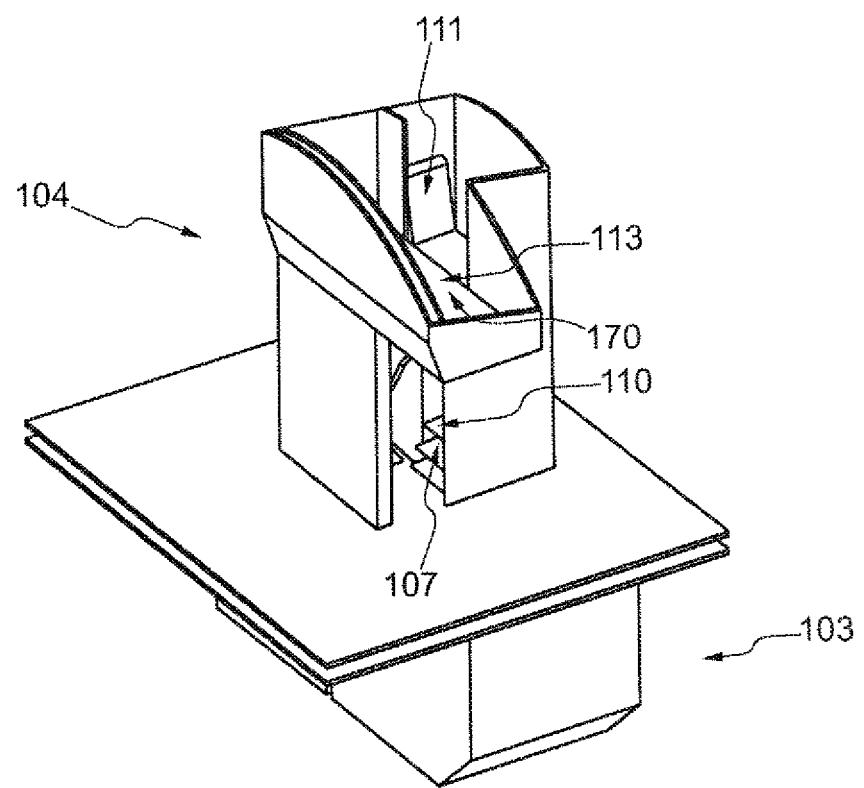
FIG. 6 shows a diagrammatic three-dimensional view of the residence and sleeping module according to the invention, according to an exemplary embodiment of the module according to the invention.

FIG. 6 shows a further diagrammatic three-dimensional view of a residence and sleeping module according to an exemplary embodiment of the present invention.

Figure 7:
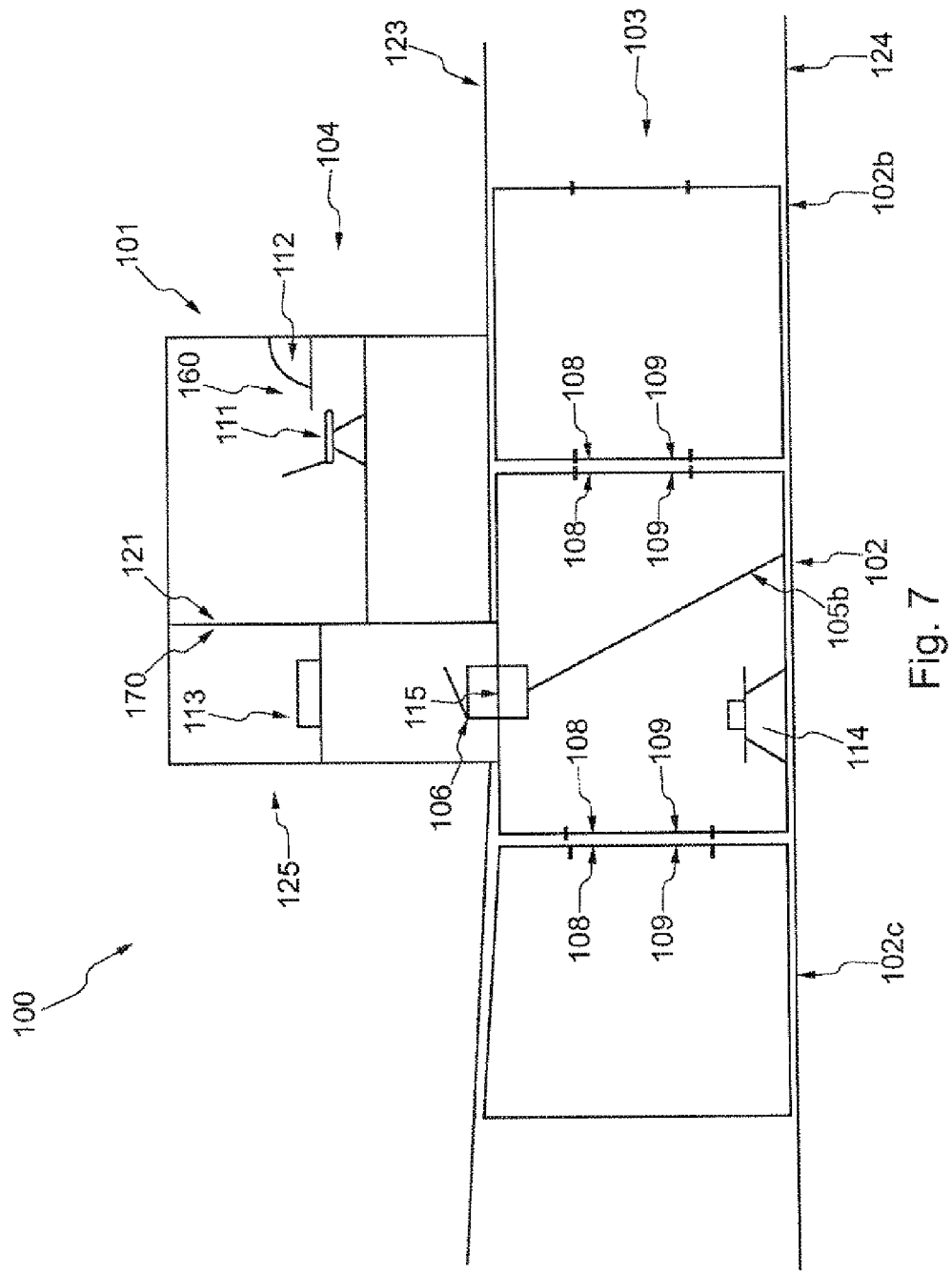
FIG. 7 shows a diagrammatic two-dimensional vertical section view according to an exemplary embodiment of the module according to the invention; variant with three partial modules on the cargo deck level.

FIG. 7 shows a further diagrammatic two-dimensional vertical section view of a module 100 according to an exemplary embodiment of the present invention. The diagram clearly shows that on both sides of the second partial module 102 further dock-on modules 102b, 102c can be docked. Such docking is effected analogously to the docking connections described so far. In this arrangement all the further partial modules comprise a transition region 108 and an opening 109 so that the further modules can contact the partial module, either connected so as to be mechanically fixed or only loosely connected, in the manner described above. Thus along the longitudinal direction of the aircraft the desired design of the module 100 according to the invention can be implemented, which significantly improves the flexibility of the entire system and integration in the cargo space. It should be noted that both the second partial module and each further partial module can each comprise two transition regions and two openings for docking-on further modules. In FIG. 7 this is shown as an example with reference to partial module 102. Furthermore, each partial module can provide further sleeping facilities, workplaces or rooms for resting and storage rooms. As an example a second sleeping facility 114 in the second partial module 102 is shown. Likewise, the connecting element 115 with the hatch 106 is show, through which it is possible to climb from the upper module end into the modules situated below. In FIG. 7 the first partial module 101 clearly shows the separation or the provision of a work region 160 and a sleeping region 170. Both regions are in the upper region (125) of the first partial module. To provide increased privacy and a better rest facility, within the crown area a partition wall 121 is inserted so that as far as sound is concerned the first sleeping facility 113 is separated from the work region 160. As an example, this work region 160 is designed with a seating facility 111, wherein a shelf or a table 112 is also shown. This example of a range of possible furnishings also applies to any other partial module or module on the cargo deck level 103. In this arrangement both the floor on the cargo deck level (124), to which floor the dock-on module can be attached, and the floor of the main deck level (123) are shown. The position of the connecting element in the floor (123) can be selected in such a way that weakening at this position is avoided and the normal transverse beams underneath the floor (123) are not damaged.

Figure 8:
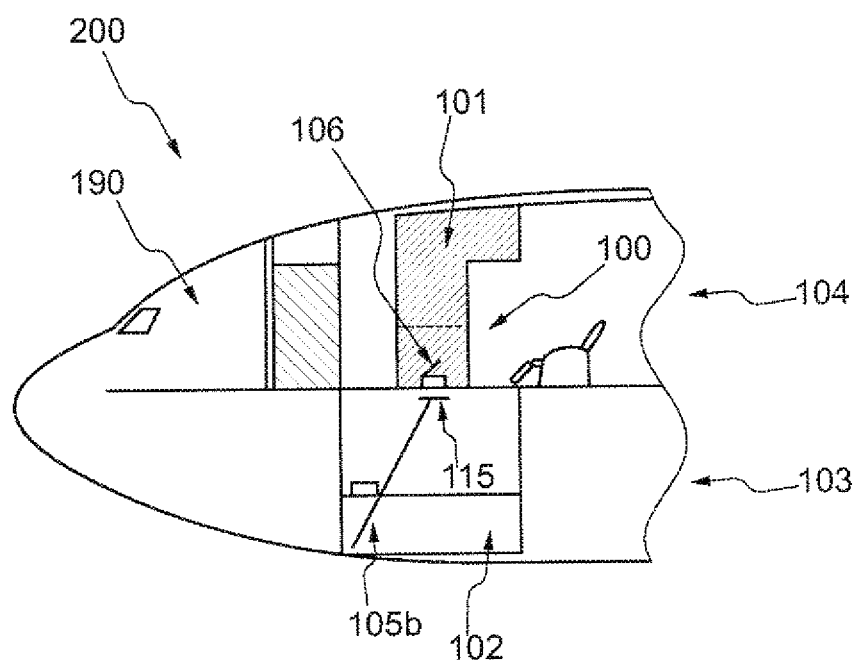
FIG. 8 shows a diagrammatic two-dimensional section view along the longitudinal axis of an aircraft, showing an exemplary embodiment of the module according to the invention.

FIG. 8 shows a diagrammatic two-dimensional vertical section view of an aircraft along the longitudinal axis of the aircraft 200. In this arrangement the module 100 according to the invention is shown with a first partial module 101 and a second partial module 102, wherein the second partial module is situated on the cargo deck level 103 underneath the main deck 104. In order to make it possible, if required, to provide the advantage of variable docking of the second partial module to the first partial module, as an example the diagram shows the connecting element 115 with a hatch 106. Climbing down into the dock-on module 102 below is by way of a second ascent device 105b. In this arrangement it is possible to implement the module 100 according to the invention in such a way that direct access from the cockpit 190 into the module 100 becomes possible. In this way a situation can be avoided in which the flight crew or the pilots have to leave the cockpit 190 and the flight crew rest compartment 100. This exemplary embodiment of the module according to the invention with a direct connection to the cockpit is not mandatory; instead, the module can be positioned or installed along the entire longitudinal axis of the aircraft.

Figure 9:
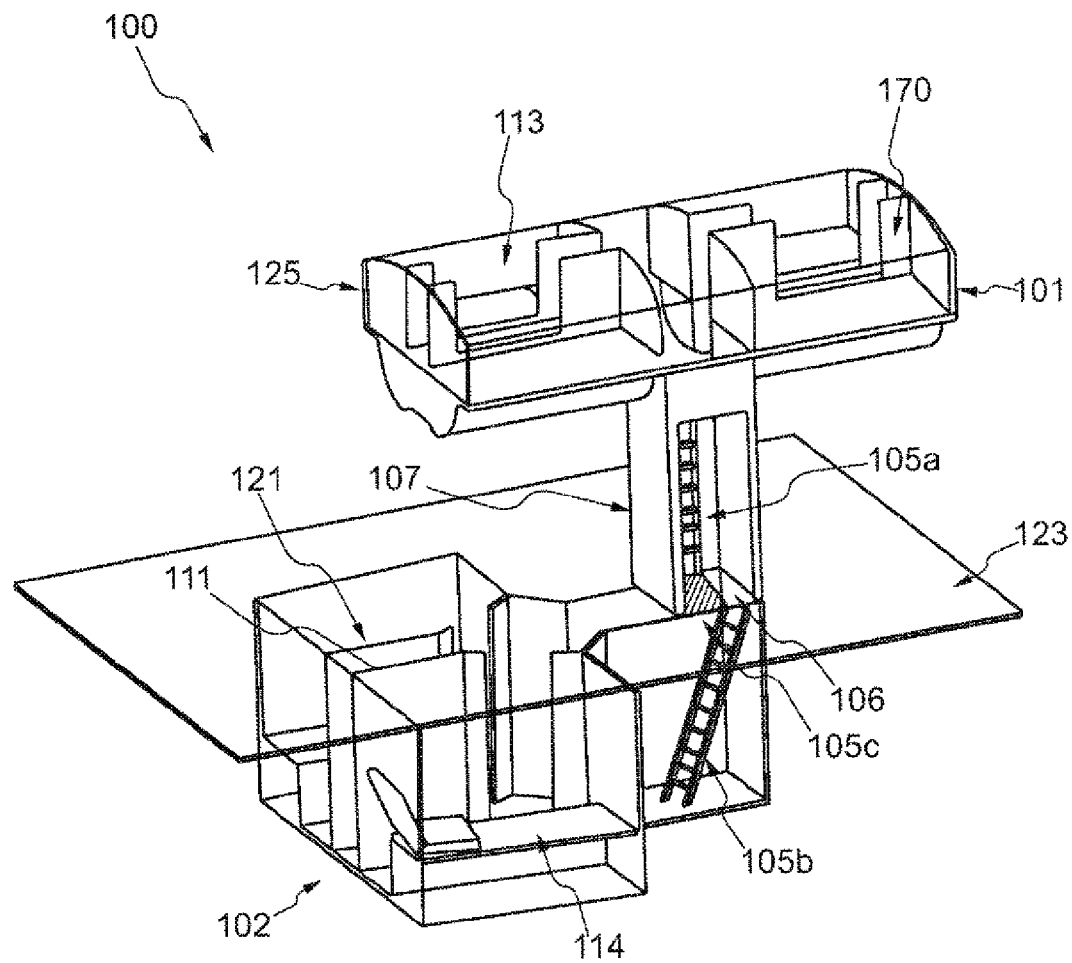
FIG. 9 shows a diagrammatic three-dimensional view of the residence and sleeping module according to an exemplary embodiment of the module according to the invention.

FIG. 9 shows a diagrammatic three-dimensional view of an exemplary embodiment of the module 100 according to the invention. A first partial module or sub-compartment 101 with a sleeping region 170 in the upper region 125 of the module is shown. The diagram shows several sleeping facilities 113 of the first partial module. By way of a staircase 107 it is possible to get from the floor 123 of the respective deck, by means of a first ascent device 105a and a second ascent device 105b of the second partial module or sub-compartment 102, into the respective module. The diagram clearly shows that the embodiment with both ascent regions arranged perpendicularly one above the other provides a decisive space advantage when compared to a solution comprising two separate stair houses. In order to facilitate entry into the perpendicular staircase 107, an additional ascent device can be installed, in the diagram shown this is, as an example, a step board 105c. As a lower module 102 a variant with several sleeping facilities 114 is shown, which are separated by partition walls 121 to improve user comfort.

Figure 10:
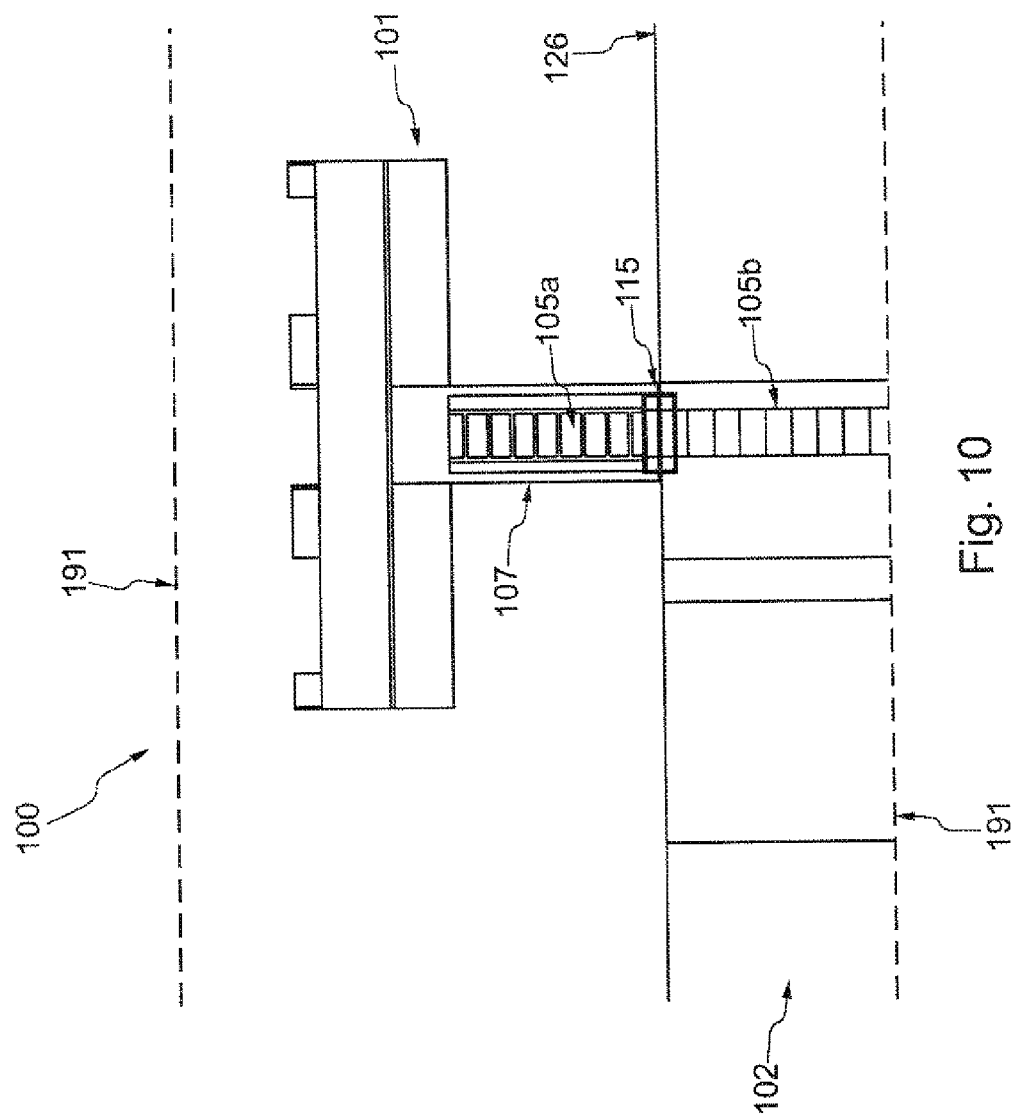
FIG. 10 shows a diagrammatic two-dimensional section view along the longitudinal axis of an aircraft, that comprises an exemplary embodiment of the module according to the invention.

FIG. 10 shows a diagrammatic two-dimensional section view of the module along the longitudinal axis of an aircraft. In this arrangement the first, upper, partial module 101 or sub-compartment and the second, lower, partial module 102 or sub-compartment are integrated in the aircraft with the fuselage 191. This view clearly shows that both partial modules are connected, by way of only one staircase 107, to the two ascent devices 105a and 105b, that can also form a single ascent device. In this arrangement only that space is used for entry into the module that would otherwise have been used anyway for the staircase of an individual compartment. This is, in particular, achieved as a result of the perpendicular embodiment of the ladders 105a and 105b that are arranged one above the other. The connecting element 115 makes it possible for both In this arrangement the separation layer 126 separates the two partial modules. If both partial modules are arranged on the same deck, this separation layer can form an intermediate deck. If the upper partial module is accommodated on the main deck, e.g. in the crown area, and the second partial module is accommodated on the cargo deck, then the separation layer 126 forms the floor of the main deck.

Figure 11:
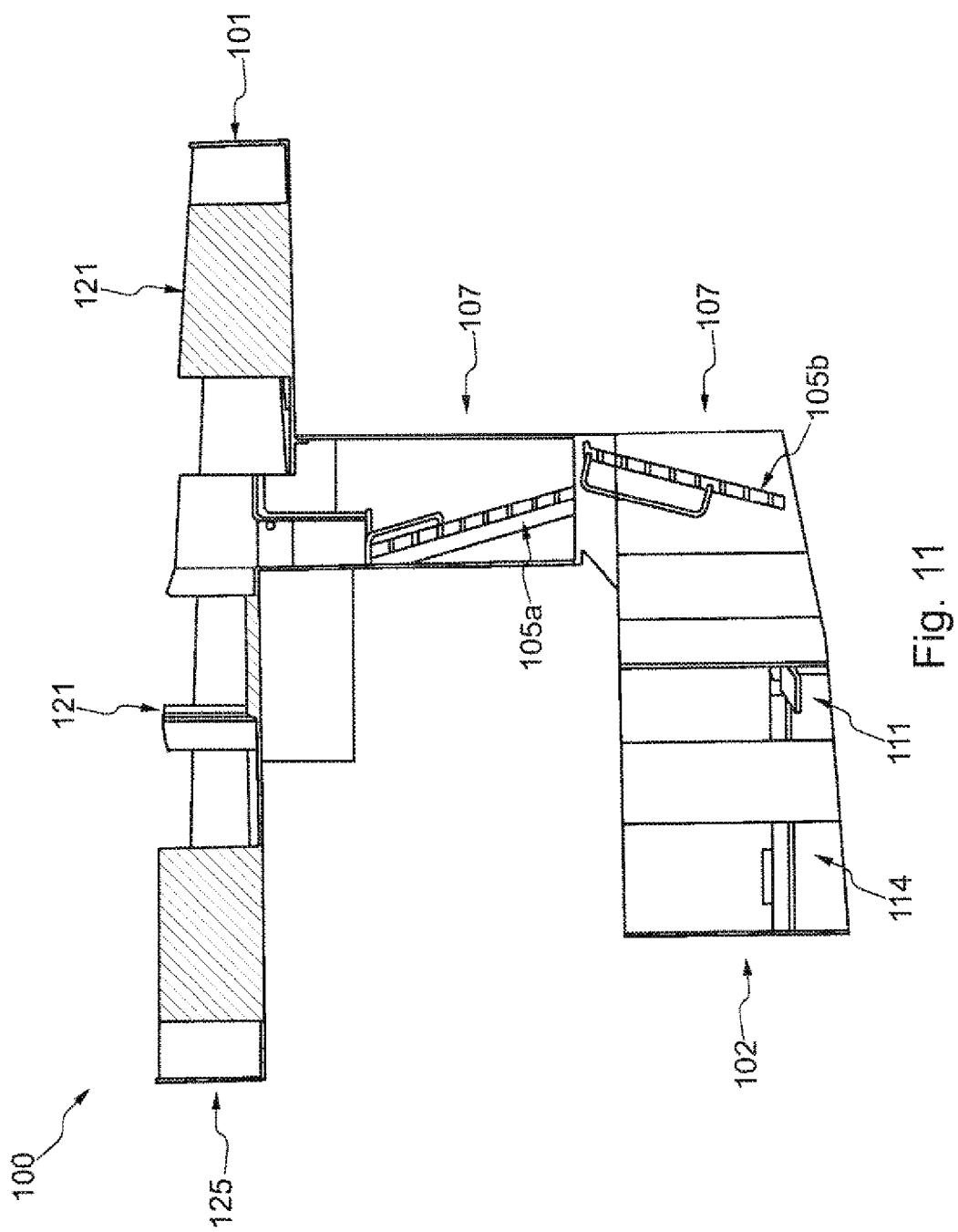
FIG. 11 shows a diagrammatic two-dimensional vertical section view of an exemplary embodiment of the module according to the invention.

FIG. 11 shows a two-dimensional vertical section view of an exemplary embodiment of the module according to the invention. In this arrangement the compartment shown comprises two partial modules that are connected by way of a single staircase. Access is by means of two ladders 105a and 105b, wherein the term "ladder" is used as an example for any desired ascent device. In this embodiment of the module the upper region 125 of the first partial module provides various sleeping regions that are separated by several partition walls 121. The lower partial module 102 comprises a sleeping facility 114 and a seating facility 111.

Figure 12:
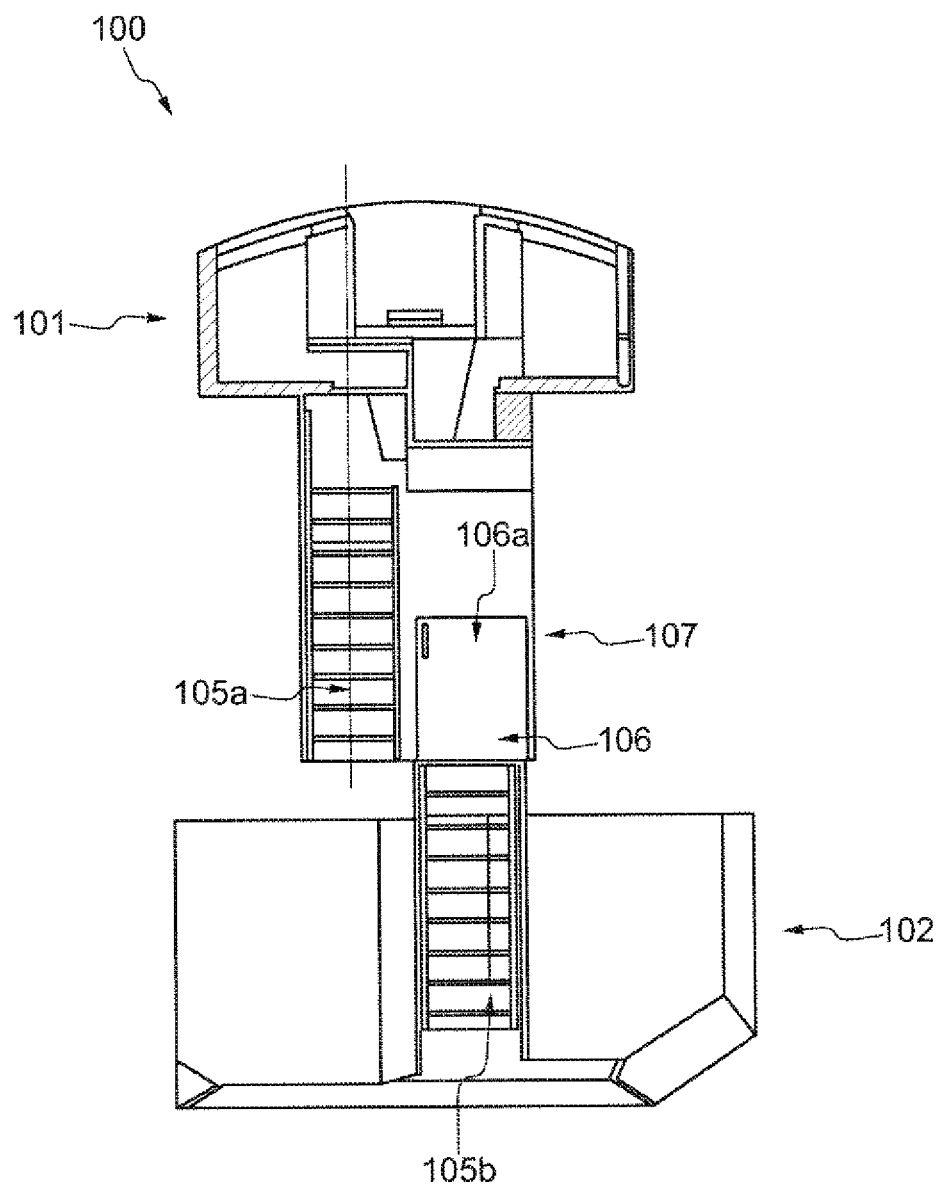
FIG. 12 shows a diagrammatic two-dimensional vertical section view of an exemplary embodiment of the module according to the invention.

FIG. 12 shows a two-dimensional vertical section view of an exemplary embodiment of the module according to the invention. The diagram shows the hatch 106 in its open state with the hatch flap 106a. The diagram also clearly shows that both partial modules 101 and 102 are connected by only one staircase 107, but that both ascent devices 105a and 105b are laterally, more precisely in the x- and y-directions, affixed so as to be offset in relation to each other.

Figure 13:
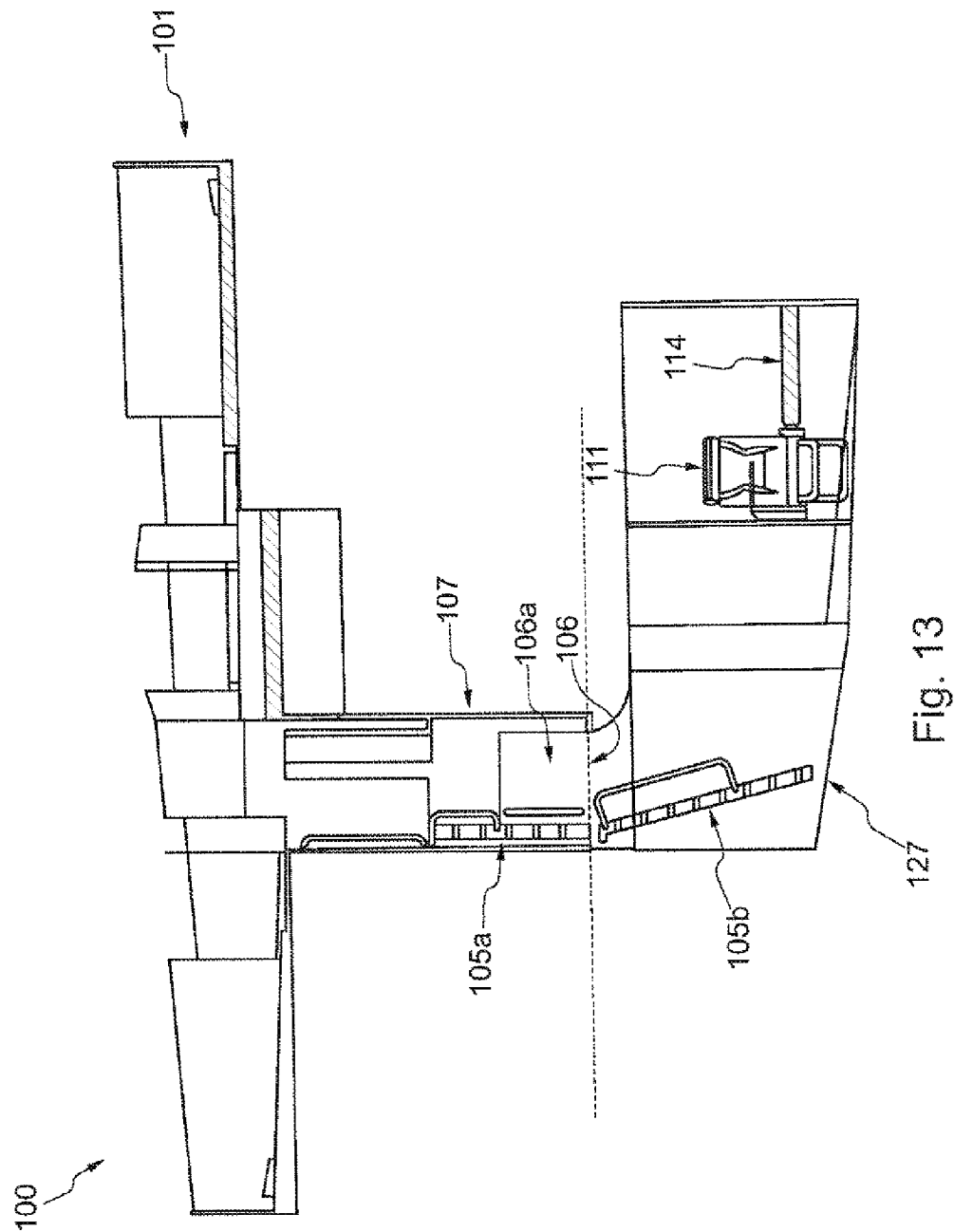
FIG. 13 shows a diagrammatic two-dimensional vertical section view of an exemplary embodiment of the module according to the invention.

FIG. 13 shows a two-dimensional vertical section view of an exemplary embodiment of the module according to the invention. Passing from the lower module to the upper module is through the open hatch flap 106a of the hatch 106. The view clearly shows that both ascent devices 105a and 105b are separate components. This ensures dock-on compatibility of the two modules, which is achieved by means of a connecting element (not shown) between the two modules. If the second partial module is accommodated on the cargo deck, for the purpose of matching the module shape to the container surroundings and to the fuselage of the aircraft it may be advantageous to design the module floor so that it is bevelled 127. Likewise, this exemplary embodiment shows sleeping facilities in the first partial module, and one or several sleeping facilities 114 and one or several seats 111 in the lower module.

Figure 14:
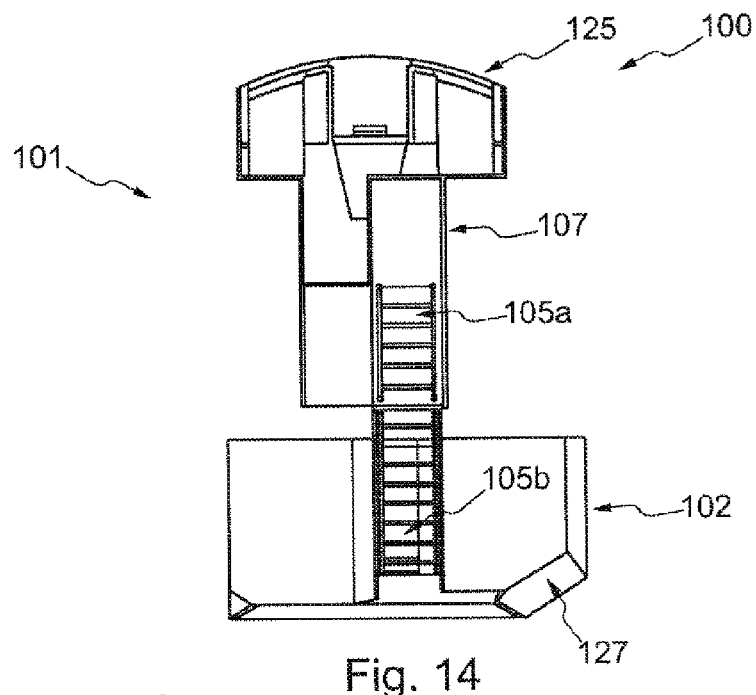
FIG. 14 shows a diagrammatic two-dimensional vertical section view of an exemplary embodiment of the module according to the invention.

FIG. 14 shows a two-dimensional vertical section view of an exemplary embodiment of the module according to the invention. The illustration shows the bevelled module floor 127 which results in improved integration in the cargo space. Here again the two ascent devices are arranged one above the other; however, the stairs or ladders are slightly offset in the x-direction.

Figure 15:
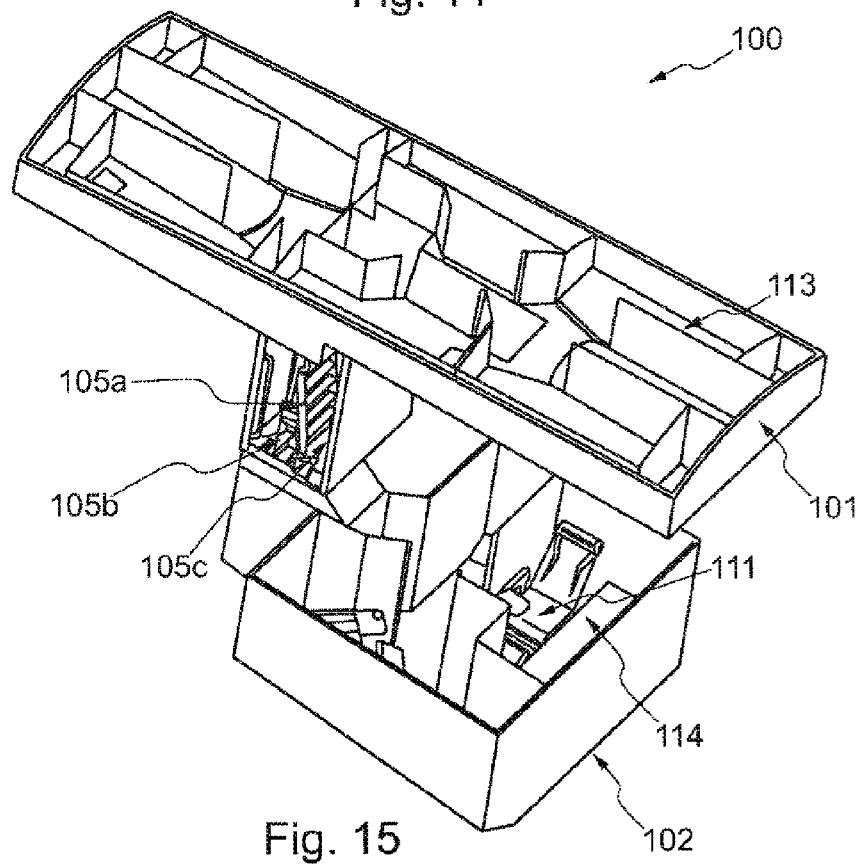
FIG. 15 shows a diagrammatic three-dimensional view of the residence and sleeping module according to an exemplary embodiment of the module according to the invention.

The above is clearly shown in FIG. 15, which is a diagrammatic three-dimensional view of the module according to the invention. The diagram also shows the step board 105c as an additional help for entry and exit. The illustration clearly shows that the lower module comprises several compartments with their own beds and seating facilities which in turn are separated by partition walls.

Figure 16:
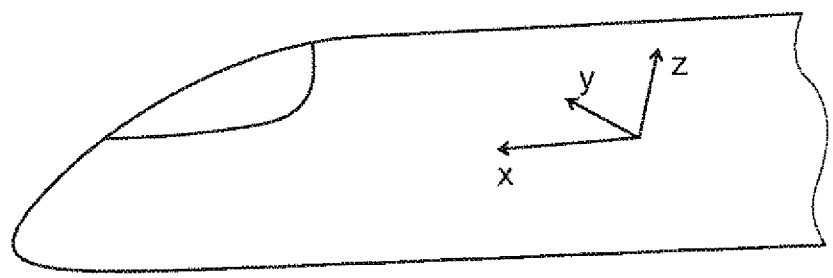
FIG. 16 shows a diagrammatic three-dimensional section view along the longitudinal axis of an aircraft.

FIG. 16 shows a three-dimensional section view along the longitudinal axis of an aircraft. The spatial directions x, y, and z that are used are defined. The x-axis is the longitudinal axis, the y-axis is the transverse axis of the aircraft, while the z-axis extends perpendicularly to the x-y plane.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

100 Residence and sleeping module
101 First partial module
102 Second partial module
102b further module or container on the cargo deck
102c further module or container on the cargo deck
103 Cargo deck
104 Main deck
105a First ascent device
105b Second ascent device
105c Additional ascent device, step board
106 Hatch
106a Hatch flap
107 Staircase
108 Transition region
109 Opening
110 Ascent region
111 Seating facility
112 Table
113 Sleeping facility in the first partial module
114 Sleeping facility in the second partial module
115 Connecting element
116-119 Trolleys
120 Storage compartments
121 Partition wall
122 Front
123 Floor
124 Floor on the cargo deck
125 Top region
126 Separation layer
127 Bevelled module floor
150 Entrance region
160 Work region
170 Sleeping region
190 Cockpit
191 Aircraft fuselage
200 Aircraft

The invention claimed is:

1. A residence and sleeping module for integration into an aircraft for accommodating at least one member of an aircraft crew, the residence and sleeping module comprising:
    a first partial module comprising a first enclosure configured to be isolated from a passenger cabin area;
    a second partial module comprising a second enclosure; and
    a connecting element,
    wherein the second partial module is connected to the first partial module by the connecting element;
    wherein the first partial module is configured to be arranged at a vertical height of an aircraft, which vertical height differs from that of the second partial module;
    wherein after integration into the aircraft the first partial module is positioned on a main deck of the aircraft, the main deck being an area where a passenger cabin is located, and the second partial module is positioned on a cargo deck, the cargo deck being an area below the main deck where cargo is stored, the connecting element being affixed to a floor of the main deck,
    wherein the first partial module extends from the main deck area substantially to the ceiling of the main deck area; and
    wherein an inside of the first partial module and an inside of the second partial module are connected to each other by a single hatch.

2. The module of claim 1, wherein the first partial module comprises at least one sleeping facility.

3. The module of claim 1, wherein the second partial module comprises at least one sleeping facility.

4. The module of claim 1, further comprising:
    a staircase;

an ascent device;
wherein the first and second partial modules are reached directly by way of the staircase.

5. The module of claim 1, further comprising:
an ascent device;
a hatch;
wherein the ascent device and the hatch are configured to provide access from the first partial module to the second partial module from the main deck through the hatch.

6. The module of claim 1, wherein the second partial module is configured in the form of a cargo container for an aircraft.

7. The module of claim 1, wherein the second partial module comprises a transition region with an opening;
wherein the opening is configured for a crew member to move from the second partial module to at least a third partial module;
wherein the at least third partial module is accommodated on the cargo deck of the aircraft.

8. The module of claim 1, with the first partial module comprising:
a first sleeping region; and
an ascent region for climbing from a lower level to an upper region of the first partial module.

9. The module of claim 1, wherein the first partial module comprises a work region to accommodate a member of the aircraft crew.

10. The module of claim 9, wherein the first partial module is configured such that the volume underneath the work region is available in full width, full depth and full height as an area in which at least one item can be placed.

11. The module of claim 9, wherein the work region comprises at least one of a seating facility, a table and an entrance region.

12. The module of claim 11, wherein the seating facility is a folding seat, aircraft seat, passenger seat, business class seat, TTL seat or high-comfort cabin attendant seat.

13. The module of claim 11, wherein the table is a folding table, solid table, backrest fold-out table or a swivellable table.

14. The module of claim 1, wherein the first partial module is configured so as to be positioned adjoining a cockpit.

15. The module of claim 1, wherein both in functionality and appearance the second partial module is a complete and proper compartment for the passenger cabin.

16. The module of claim 1, wherein the connecting element comprises a trim element rather than for force take-up.

17. The module of claim 1, wherein
the connecting element comprises a closing element.

18. An aircraft comprising:
a main deck;
a cargo deck positioned below the main deck; and
a residence and sleeping module comprising:
a first partial module comprising a first enclosure configured to be isolated from a passenger cabin area;
a second partial module comprising a second enclosure; and
a connecting element providing a connection of the first partial module to the second partial module, the connecting element being affixed to a floor of a deck of the aircraft, and wherein the first partial module is located on the main deck and the second partial module is located on the cargo deck; and
wherein the first partial module extends from the main deck area substantially to the ceiling of the main deck area.

19. The aircraft of claim 18, wherein the first partial module is adapted as a fixed installation on the main deck of the aircraft.

20. The residence and sleeping module of claim 1, wherein the first partial module is configured to be accessed via a security unit comprising a cockpit and the residence and sleeping module.

21. The aircraft of claim 18, wherein the first partial module is configured to be accessed via a security unit comprising a cockpit and the residence and sleeping module.

* * * * *